United States Patent
Otsuka et al.

(10) Patent No.: US 6,700,674 B1
(45) Date of Patent: Mar. 2, 2004

(54) FACSIMILE APPARATUS AND STORAGE MEDIUM

(75) Inventors: Shuji Otsuka, Nagoya (JP); Fumihiro Minamizawa, Toyoake (JP); Satoshi Matsushita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/174,092

(22) Filed: Oct. 16, 1998

(30) Foreign Application Priority Data

| Nov. 27, 1997 | (JP) | 9-342257 |
| Jan. 7, 1998 | (JP) | 10-013211 |
| Jan. 26, 1998 | (JP) | 10-027781 |

(51) Int. Cl.$^7$ ............................. G06F 13/00; H04N 1/00
(52) U.S. Cl. ....................... 358/1.15; 358/402; 358/407; 379/100.09; 379/100.12; 709/239
(58) Field of Search ............................. 358/1.15, 402, 358/403, 407, 434, 442, 440, 443, 444, 468; 709/238, 239, 240, 242, 243, 244; 379/93.07, 93.09, 100.01, 100.09, 100.12

(56) References Cited

U.S. PATENT DOCUMENTS

| 5,146,348 A | * | 9/1992 | Kaneyama | 358/407 |
| 5,381,527 A | * | 1/1995 | Inniss et al. | 709/239 |
| 5,712,907 A | * | 1/1998 | Wegner et al. | 379/112 |
| 5,826,034 A | * | 10/1998 | Albal | 709/239 |
| 5,999,598 A | * | 12/1999 | Henrick et al. | 379/93.07 |
| 6,005,677 A | * | 12/1999 | Suzuki | 358/442 |
| 6,043,904 A | * | 3/2000 | Nickerson | 358/442 |
| 6,058,169 A | * | 5/2000 | Bramnick et al. | 379/100.01 |
| 6,064,653 A | * | 5/2000 | Farris | 370/237 |
| 6,072,862 A | * | 6/2000 | Srinivasan | 379/100.08 |
| 6,085,101 A | * | 7/2000 | Jain et al. | 455/500 |
| 6,088,125 A | * | 7/2000 | Okada et al. | 358/405 |
| 6,192,045 B1 | * | 2/2001 | Williams et al. | 370/352 |
| 6,374,291 B1 | * | 4/2002 | Ishibashi et al. | 709/206 |

FOREIGN PATENT DOCUMENTS

| EP | 0 371 607 | 6/1990 |
| EP | 0 887 994 | 12/1998 |
| JP | 61-200763 | 9/1986 |

(List continued on next page.)

*Primary Examiner*—Edward Coles
*Assistant Examiner*—Joseph R. Pokrzywa
(74) *Attorney, Agent, or Firm*—Oliff & Berridge, PLC

(57) ABSTRACT

A facsimile apparatus is capable of automatically transmitting image data through two communication routes, a communication route via an internet and a public communication switched network. The facsimile apparatus has the capability of establishing a priority order for transmitting data through the two communication routes. In a normal transmission, the data will be transmitted through the highest priority communication route. In another mode, if communication cannot be made through the first communication route, normally the highest priority communication route, the system will automatically attempt to transmit the data through the second communication route. In a final mode, when it is determined that a transmission is urgent, the apparatus executes a two-route transmission operation. In the two-route transmission operation, if e-mail is the highest priority, the apparatus transmits the data together with e-mail to a personal computer of the addressee via the internet. Then, the apparatus transmits the image data to a facsimile apparatus of the addressee through the public communication switched network. The converse is true if the public communication switched network is the priority. Thus, the apparatus increases the likelihood that the addressee will be aware of and see the data as soon as possible, providing an advantage in the transmission of an urgent matter.

38 Claims, 16 Drawing Sheets

FOREIGN PATENT DOCUMENTS

| | | |
|---|---|---|
| JP | 1-284066 | 11/1989 |
| JP | 2-184142 | 6/1990 |
| JP | 11-69071 | 6/1991 |
| JP | 3-151747 | 6/1991 |
| JP | A-8-242326 | 9/1996 |
| JP | A-9-149189 | 6/1997 |
| JP | 9-233187 | 9/1997 |
| JP | 9-252393 | 9/1997 |
| JP | 10-145574 | 5/1998 |
| JP | 10-260924 | 9/1998 |
| JP | 9-163064 | 12/1998 |
| JP | 11-32194 | 2/1999 |
| JP | 11-74986 | 3/1999 |
| JP | 11-112778 | 4/1999 |
| JP | 11-187240 | 7/1999 |
| WO | WO 97/10668 * | 3/1997 |
| WO | WO-97/10668 A1 * | 3/1997 ............ H04N/1/00 |

* cited by examiner

| | NAME | PRIORITY ROUTE | ANCILLIARY ROUTE |
|---|---|---|---|
| 1 | ○○○ESQ | 033-123-4567 | abc. @def. or. jp |
| 2 | □□□ESQ | 052-987-6543 | |
| ⋮ | ⋮ | ⋮ | ⋮ |
| 8 | △△△ESQ | 012-345-6789 | xyz. @abc. or. usa |
| ⋮ | ⋮ | ⋮ | ⋮ |
| 10 | △△△ESQ | pgr@mno.com.jp | 033-654-2387 |

| ONE-TOUCH BUTTON 1 | ADDRESS NAME 1 | TELEPHONE NUMBER 1 | E-MAIL ADDRESS 1 |

FIG. 10(A)

| ONE-TOUCH BUTTON 1 | ADDRESS NAME 1 | E-MAIL ADDRESS 1 | TELEPHONE NUMBER 1 |

FACSIMILE APPARATUS AND STORAGE MEDIUM

BACKGROUND OF THE INVENTION

1. Field of the invention

The invention relates to a facsimile apparatus capable of transmitting data through a communication route via an internet and/or a public communication switched network not via an internet.

2. Description of the Related Art

In the case of transmission of an urgent matter to a receiver having a terminal apparatus capable of receiving a transmission via the internet and a facsimile apparatus that receives a transmission through a public communication switched network, the transmission to the facsimile apparatus can immediately reach the receiving person, provided that the receiver is near the facsimile apparatus at the time of transmission. Similarly, the e-mail transmission via the internet can immediately reach the receiver, provided that the receiver is near the terminal apparatus at the moment.

Therefore, the sender must transmit the data of the urgent matter to the receiver by both facsimile transmission and e-mail, that is, by transmitting the data via one of the two communication routes, and switching to the other communication route after confirming the completion of transmission through the first communication route, and then transmitting the same data via the other communication route, according to the conventional art.

However, to transmit data from a conventional facsimile apparatus serially through two communication routes as described above, the conventional facsimile apparatus (such as disclosed in Japanese Laid-Open Patent Publications Nos. 8-242326 and 9-149189) requires the sender to manually switch from one communication route to the other. Therefore, the sender cannot leave the facsimile apparatus before switching the communication routes subsequent to the end of the transmission through the first communication route. The conventional facsimile apparatus thus requires a considerable amount of time and labor of the sender to send a message via both routes.

Thus, although the memory format of the address information disclosed in FIGS. 1 and 5 of the Japanese Laid-Open Patent Publication No. 9-149189, has a structure to register a telephone number or e-mail address for every address, when the same address is capable of performing fax communication by using either route, i.e., via the public line network or an internet, there is a problem in that the designation of the phone number and the e-mail address had to be operated separately for the same addressee as discussed above.

A further problem in the conventional apparatus is that when a telephone number is provided for the addressee and facsimile transmission is performed, when the facsimile transmission cannot be carried out even though redialing is repeated the number of times established for the country in which the facsimile apparatus is installed, the redialing ends, and the operator must again initiate an operation for facsimile transmission.

Additionally, when performing a facsimile transmission via the internet, when facsimile information, that has been converted to electronic mail, does not arrive at the receiver for some reason, a non-delivery notification is returned as electronic mail. In this case, too, the sender must repeat the operation for the facsimile transmission.

Further, when performing facsimile transmission via the internet, when the facsimile apparatus is connected to the internet via a specified server, the user must confirm whether the electronic mail indicating non-delivery has arrived at the server and, if non-delivery is the case, the operator must repeat the transmission operation.

Additionally, when facsimile transmission is to be performed via the internet and the transmission does not arrive at the receiver or addressee, even if the device is provided with a retry function that automatically retransmits, the number of retries is determined by the number of redials set when using the public communication switched network.

Thus, in a conventional facsimile apparatus that corresponds via the internet, when the image information does not arrive at the receiver due to some kind of trouble in the transmission method that is initially chosen, the sender must perform an operation necessary to retransmit the information. Moreover, since there are limits to the number of retries, the rate of image information arriving at the receiver cannot be improved.

SUMMARY OF THE INVENTION

A solution to the problem of requiring the operator to sequentially send the data via facsimile using the telephone number and the Internet using the e-mail address is to use a one-touch button or buttons.

However, there may be a problem in that an operation of selecting whether the data transmission is to be performed as a facsimile to the telephone number or via the Internet to the e-mail address only when the addressee has been designated by the one-touch button. For example, when the message is urgent it may be desirable to transmit the data via both routes, however, when sending a confidential document it may be desired to limit the selection of the transmission route to the public communication switched network. In such a case, an automatic one-touch button is inappropriate.

To address these problems and provide a facsimile apparatus that provides the greatest flexibility to the operator, the invention provides the capability of setting a priority for the communication route, provides for automatic switching to the second communication route when the first, or priority, route is unsuccessful, or provides for transmission over both communication routes should it be essential the receiver, or addressee, receives the message as soon as possible. These capabilities may be chosen and used individually or in combination.

Accordingly, it is an object of the invention to provide a facsimile apparatus that facilitates the operations necessary for a user to perform in order to transmit image information read from a document by an image reading device through the two communication routes.

According to a first aspect of the invention there is provided a facsimile apparatus including a public line facsimile transmission means that executes a facsimile transmission via a public communication switched network when a telephone number is designated as an address, an internet facsimile transmission means that executes a facsimile transmission via the internet when an e-mail address is designated as an address, an address information registration means that is structured so that the telephone number and the e-mail address for an addressee can be registered for a plurality of addressees, and which, when registering the telephone number and e-mail address of an addressee, also registers a priority order unique to each addressee that determines which communication route is the priority route when the addressee is selected as the facsimile receiving party, an addressee selecting means that selects a desired addressee among the plurality of addressees that are registered by the address information registration means, and a transmission route determining means that determines whether to perform a facsimile transmission by using the public communication switched network or by using the internet facsimile transmission means in accordance with the priority order of the addressee that is selected by the addressee selecting means.

Thus, when performing the address registration, in addition to the telephone number and the e-mail address, it is possible to register information identifying which of the telephone number or the e-mail address of an addressee is the priority communication route. Therefore, when a facsimile transmission using the public communication switched network is the normal way of communicating with an addressee, that communication route will be automatically selected by the transmission route determining means in accordance with the registration content of the unique priority order, and the facsimile sent to the addressee. Conversely, if the e-mail address is the priority address, then selection of the addressee will automatically result in selection and sending the data via the internet.

The facsimile apparatus of the invention further includes a priority order changing means that changes the unique priority order that is registered for each addressee prior to the transmission. When the priority route is changed, the transmission route determining means then identifies the new priority communication route for the instant communication.

It is also preferable, when the address is selected by the address selecting means, to also provide a priority order display means that displays the unique priority order which is registered for the aforementioned address. This is so that the user can easily perform an evaluation of whether the priority order changing means should be activated by displaying how the priority order was registered initially.

To improve the operation of the facsimile apparatus, not only is it desirable to permit a change in the priority route of an individual transmission, it is also preferred that the invention permit changing the priority order for the communication routes to an addressee on a permanent basis, i.e., re-register the priority order, based on a change in circumstances at the receiver or addressee.

The invention also has an object of, in a facsimile device that corresponds via an internet and which can transmit using both a public communication switched network and the internet, improving the rate of image information arriving at a receiver while minimizing the operations required of the user. Additionally, the invention has another object of, in a facsimile device that corresponds via the internet, and which is connected to the Internet via a server, improving the rate of image information arriving at the receiver or addressee, while minimizing the operations required of the operator.

Thus, the facsimile apparatus of the invention, which includes a first transmission means that transmits image information via the internet and a second transmission means that transmits image information via the normal public communication switched network, further includes switching/re-transmitting means which, when the facsimile apparatus transmits the image information by one of the first transmitting means and the second transmitting means to a receiver or addressee that can receive communications through both the public communication switched network and the internet, and the image information cannot correctly reach the receiver when transmitted by the one transmitting means, automatically switches to the other transmitting means and transmits the image information. Therefore, the arrival rate of image data at the receiver or addressee that can receive image information through both the public communication switched network and the internet can be improved, while minimizing the operations by the sender, or operator of the transmitting facsimile apparatus.

Additionally, the facsimile apparatus, that transmits image information through the internet via a specified server, also includes automatic confirming means which, after the transmission has been performed by the transmitting means, automatically proceeds to confirm whether a non-delivery notice or a delivery notice has arrived at the server; and automatic re-transmitting means which, when it is determined by the automatic confirming means that a non-delivery notice has arrived at the server, or that, even though a specified time has elapsed, a delivery notice has not arrived, performs re-transmission of the image information by the transmitting means.

Thus, after transmission has been performed by the transmitting means, even if the sender does not go to confirm whether a non-delivery notice or delivery notice has arrived at the server, the automatic confirming means proceeds to confirm whether a non-delivery notice or delivery notice has arrived at the server. When a non-delivery notice has arrived at the server, or when a delivery notice has not arrived even though a specified period of time has elapsed, the automatic retransmitting means retransmits the image information via the transmitting means. As a result, when image information has not correctly arrived at the receiver or addressee, retransmission processing is automatically executed even though the sender does not perform a retransmitting operation, and the rate of arrival of image information via the internet can be improved.

Alternatively, the facsimile apparatus, which has the automatic confirming means that, after transmission has been performed by the first transmitting means to a receiver or addressee that can receive through both the public communication switched network and the internet, automatically proceeds to confirm whether a non-delivery notice or a delivery notice has arrived at the server; and switching/re-transmitting means which, when it is confirmed by the automatic confirming means that a non-delivery notice has arrived at the server, or that, even though a specified time has elapsed, a delivery notice has not arrived, switches to the second transmitting means and re-transmits the image information using the second transmitting means.

In this mode, when the first transmitting means is initially selected and image information is transmitted to a receiver that can receive image information through both a public communication switched network and the internet but the image information has not arrived, the automatic confirming means automatically detects the situation by going to the server to confirm whether the information arrived, and the switching/re-transmitting means automatically switches to transmission by the second transmitting means via the public communication switched network and transmits the image information. As a result, the sender or operator is spared the trouble of going to the server to confirm whether the receiver has received the electronic mail, and when the information does not arrive at the addressee, the invention, by automatically switching to transmission through the public communication switched network, can improve the rate of arrival of the information at the addressee.

Additionally, the invention includes individual number-of-retransmission setting means that individually sets a number of re-transmissions for each of the first transmitting means and the second transmitting means; and switching/re-transmitting means which, when image information cannot reach a receiver or addressee that can receive through both the public communication switched network and the internet, even though transmission has been repeated by one of the first transmitting means and the second transmitting means according to the setting of the individual number-of-retransmission setting means, automatically switches to the other transmitting means and re-transmits the image information.

Thus, by providing an individual number-of-retransmission setting means, the number of retries, which, for example, is the number of times that retransmission will automatically be attempted via the internet, can be set to a value higher than the number of redials of a conventional line network. As a result, the rate of the retry ending without a connection ever being made when transmission is performed via the internet can be decreased, and the arrival rate of image information can be improved. Moreover, when the receiver can receive through both the internet and the public communication switched network, when one of the public communication switched network and the internet is chosen and transmission is performed but the redialing ends or the retries end, the switching/re-transmitting means operates and switches to the other transmitting means. This also improves the rate of arrival of image transmission.

According to a further aspect of the invention, there is provided a facsimile apparatus including an image reading device that reads image information from a document, a storage device that stores receiver, or addressee, specifying information that specifies a receiver of the image information read by the image reading device, corresponding to the receiver, a selection device that enables selection of the receiver from information stored in the storage device, a transmission device that transmits the image information read by the image reading device to the receiver selected by the selection device through a communication route, on the basis of the receiver specifying information, and an instruction device that provides an instruction to transmit the image information to the receiver selected by the selection device through at least two different communication routes. Upon the instruction from the instruction device, the transmission device transmits the image information to the receiver through the at least two different communication routes, on the basis of the receiver specifying information stored in the storage device in correspondence to the receiver selected by the selection device.

In this facsimile apparatus, the instruction device provides the instruction to transmit the image information read from a document by the image reading device to the receiver selected by the selection device through at least two different communication routes. Upon the instruction from the instruction device, the transmission device of the facsimile apparatus transmits the image information through the at least two different communication routes, on the basis of the receiver specifying information stored in the storage device in correspondence with the receiver selected by the selection device.

In short, if the instruction is provided to transmit the image information through the at least two different communication routes, the facsimile apparatus can automatically transmit the image information through the at least two communication routes.

Therefore, the facsimile apparatus eliminates the need for an operator to perform an operation of switching from one communication route to another, thereby simplifying the operations that need to be performed by a user.

The at least two different communication routes include a communication route via an internet, and a public communication switched network which is not via the internet. The access to the internet may be via a local area network, through a computer linked to the facsimile apparatus, or directly from the facsimile to an internet service provider, or any other communication structure known to one skilled in the art. The storage device stores at least one of a mail address that specifies the receiver, or addressee, for the transmission of the image information through the communication route via the internet and a facsimile number that specifies the receiver for the transmission of the image information through the public communication switched network, in correspondence with the receiver. The facsimile apparatus further includes a determination device that, upon the instruction from the instruction device, determines whether both the mail address and the facsimile number are stored in the storage device in correspondence with the receiver selected by the selection device and/or their order of priority. If the determination device determines that both the mail address and the facsimile number are stored in correspondence with the selected receiver, the transmission device transmits the image information through both the communication route via the internet and the public communication switched network.

The facsimile apparatus having such a structure is suitable if the apparatus is connected to the communication route via the internet and the public communication switched network.

For transmission through the communication route via the internet and the public communication switched network, the mail address and the facsimile number of the receiver of the transmission must be provided.

In the above-described structure, the storage device stores at least one of a mail address and a facsimile number in correspondence with a receiver. If both the mail address and the facsimile number of a receiver are stored in the storage device, the facsimile apparatus can transmit image information to the receiver through both communication routes on the basis of the mail address and the facsimile number of the receiver.

If the instruction device provides the instruction, the determination device determines whether both the mail address and the facsimile number are stored in the storage device in correspondence with the receiver selected by the selection device.

In short, the determination device determines whether transmission of image information through the two communication routes is possible.

If the determination device determines that both the mail address and the facsimile number of the receiver selected by the selection device are stored in the storage device, the facsimile apparatus transmits the image information to the receiver through the communication route via the internet and the public communication switched network.

The facsimile apparatus of the invention may further include a notification device that, if the determination device determines that only one of the mail address and the facsimile number is stored in correspondence with the receiver selected by the selection device, notifies that it is impossible to transmit the image information through the at least two communication routes.

Upon the notification provided by the notification device, an operator of the facsimile apparatus becomes aware that the transmission of the image information through the two communication routes is impossible. Therefore, the operator can immediately take other action. For example, if the facsimile number of the receiver is stored in the storage device, the operator can operate the facsimile apparatus to transmit the image information through the public communication switched network.

The facsimile apparatus of the invention may further have a structure as follows. An e-mail transmission device that transmits an e-mail via the internet is provided. If the image information is to be transmitted through the communication route via the internet, the image information is attached to an e-mail, and then transmitted together with the e-mail to the receiver specified by the mail address.

By attaching image information to an e-mail and transmitting the e-mail, the facsimile apparatus can easily transmit the image information.

According to another aspect of the invention, there is provided a storage medium storing computer programs including a program for controlling a facsimile apparatus including an image reading device that reads image information from a document, a storage device that stores receiver specifying information that specifies a receiver of the image information read by the image reading device, corresponding to the receiver, a selection device that enables selection of the receiver from information stored in the storage device, and a transmission device that transmits the image information read by the image reading device to the receiver selected by the selection device, through a communication route, on the basis of the receiver specifying information. The computer programs stored in the storage medium further include an instruction program for providing an instruction to transmit the image information read by the image reading device to the receiver selected by the selection device through at least two different communication routes, and a transmission control program for, if the instruction is provided by the instruction program, transmitting the image information through the at least two different communication routes on the basis of the receiver specifying information stored in correspondence with the receiver selected by the selection device.

The object of the invention can also be achieved by the storage medium. For example, if the facsimile apparatus is connected to a computer that is able to control the operating condition of the facsimile apparatus, the instruction and the transmission control as described above can be realized by installing the programs from the recording medium into the computer.

BRIEF DESCRIPTION OF THE DRAWINGS

Preferred embodiments of the invention will be described in detail with reference to the following figures wherein:

FIGS. 10(A) and 10(B) are explanatory drawings showing the display condition of the registration content when the one-touch button is pressed in the first mode;

DETAILED DESCRIPTION OF PREFERRED EMBODIMENTS

Preferred embodiments of the invention, and the preferred modes of operation, will be described in detail hereinafter with reference to the accompanying drawings.

Figure 1:
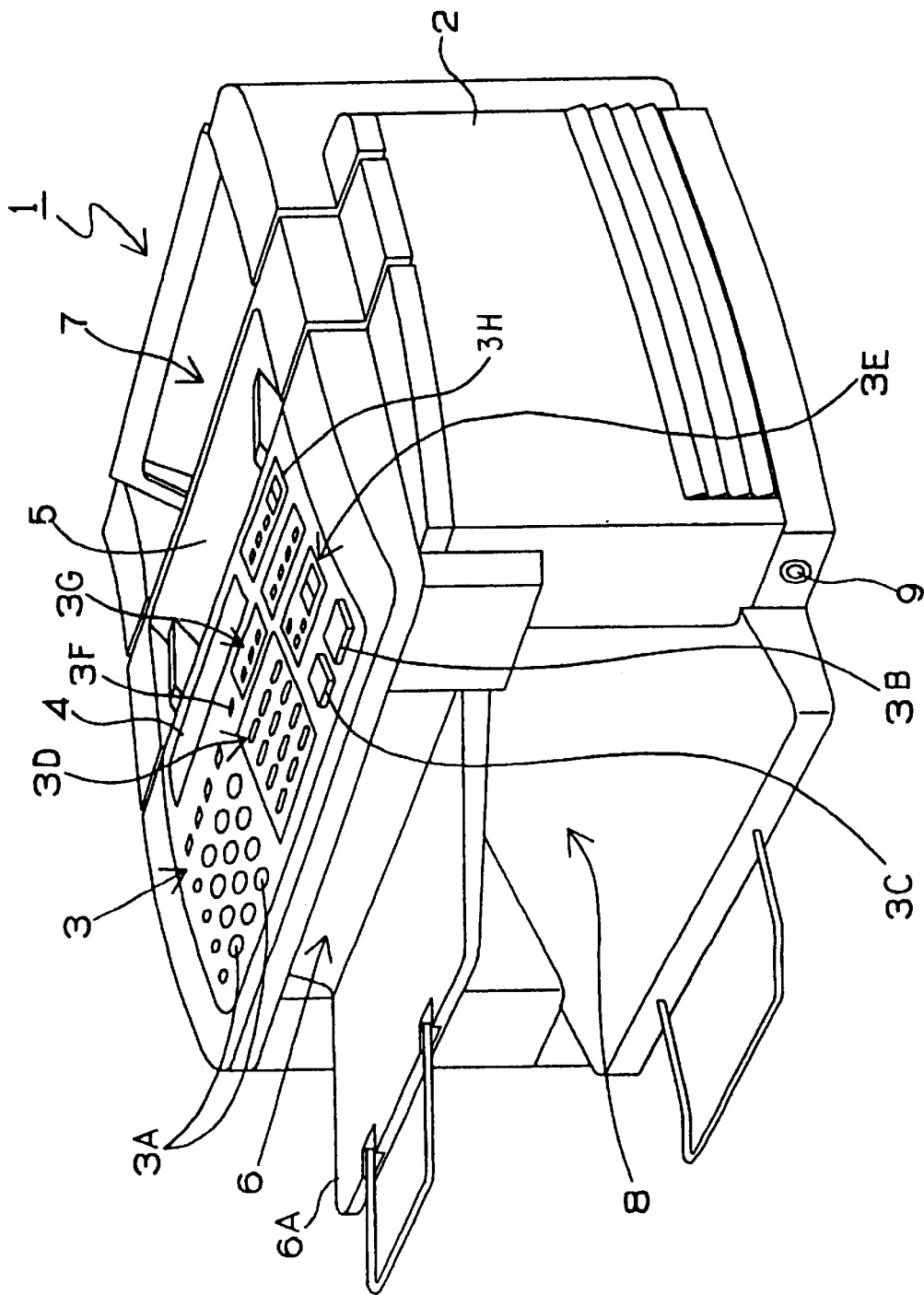
FIG. 1 shows an external appearance of a facsimile apparatus according to a preferred embodiment of the invention.

The invention will be described in conjunction with a multi-function facsimile apparatus (FIG. 1) equipped with a facsimile function and various other functions, such as an e-mail function, an image scanner function, a printer function, and a copier function. Other functions may also be incorporated into the apparatus.

The facsimile apparatus 1 has a box-shaped housing 2. An operating panel 3 is provided in an upper front portion of the housing 2. The operating panel 3 has various buttons, including "0" to "9" numerical keys 3A for inputting facsimile numbers or other data for the receiver of the transmission of image data read by an image reading device, a start button 3B for inputting an image-data transmission start instruction or other instructions as programmed, a stop button 3C for inputting an image-data transmission stop instruction, speed-call buttons 3D for transmission of image data by using speed-call numbers or abbreviated numbers, change buttons 3E for changing between a facsimile mode and a printer mode, an urgent mode button 3F for transmission of image data through a communication route via the internet and a public communication switched network in the case of transmission of an urgent matter, resolution setting buttons 3G for setting a document reading resolution, a mode setting and scrolling buttons 3H, including a button for setting a priority mode, and other buttons if appropriate or necessary.

The numerical keys 3A are designed so that they can also be used to input characters and symbols, that is, they can also be used to input a receiver's e-mail address, and the like. The urgent-mode button 3F switches between the on and off-state every time it is pressed.

Figure 3:
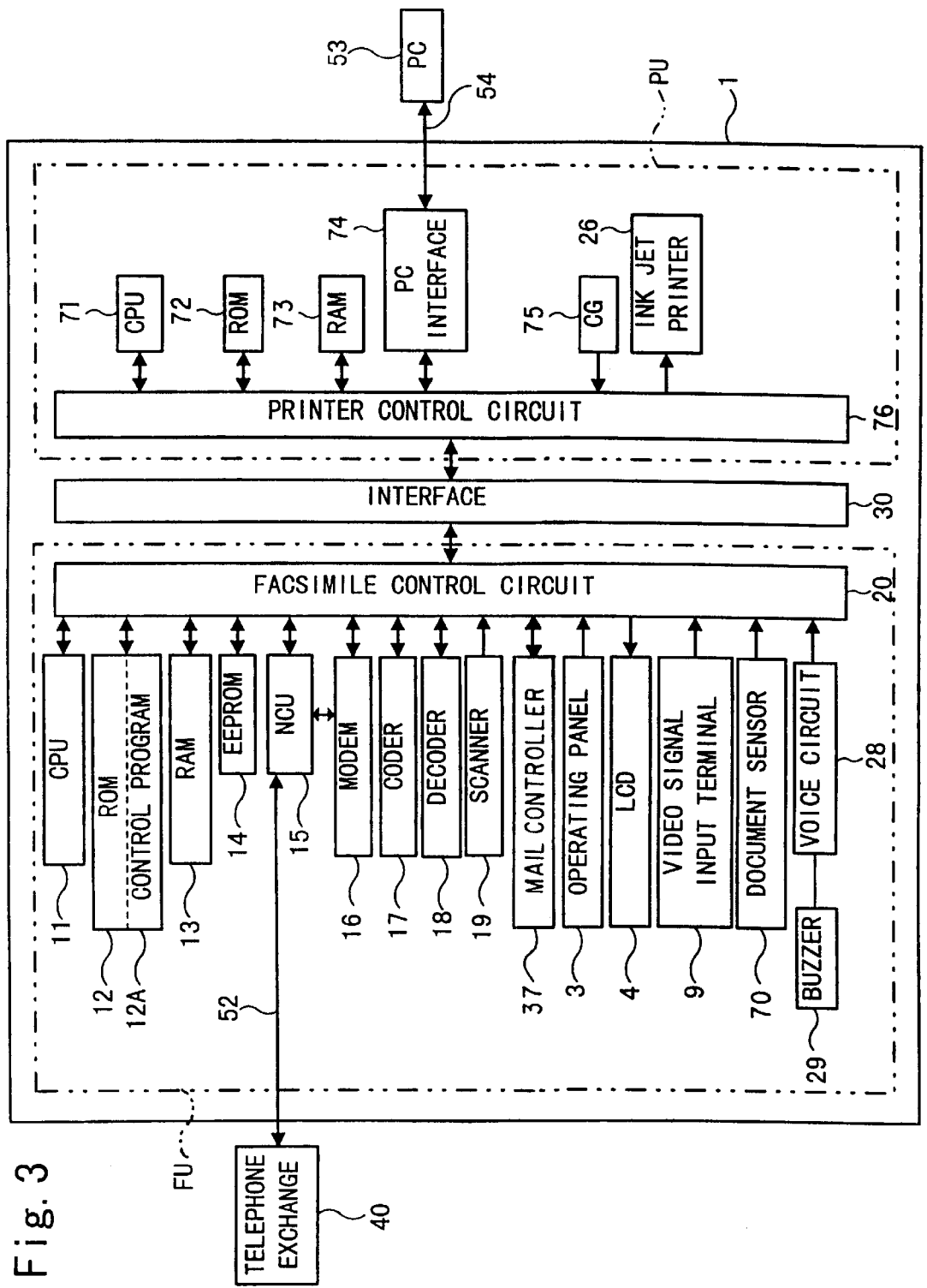
FIG. 3 is a block diagram of a main electrical arrangement of the facsimile apparatus shown in FIG. 1.

Disposed rearward of the operating panel 3 is a liquid crystal display (LCD) 4 for displaying the mail address or facsimile number of a receiver, transmission status, a message indicating that transmission through the urgent mode is not available, and other information. Provided rearward of the LCD 4 is a document setting portion 5 for setting a document to be transmitted or copied. A document sheet is conveyed from the document setting portion 5 into the interior of the housing 2 by a sheet feeder mechanism (not shown) that is provided inside the housing 2, and image information is read from the document by an image scanner 19 (FIG. 3). After image information is read, the document is discharged onto a tray 6A through a document discharge opening 6 formed below the operating panel 3. A plurality of document sheets can be stacked on the tray 6A.

Formed rearward of the document setting portion 5 is a recording sheet setting portion 7 for setting recording sheets (recording medium sheets) on which received image data or print data will be recorded. The recording sheet setting portion 7 receives therein a detachable sheet cassette (not shown) capable of containing a stack of recording sheets. From the sheet cassette set into the recording sheet setting portion 7, a recording sheet is conveyed into the housing 2 by the sheet feeder mechanism, and then subjected to ink jet recording by an ink jet printer 26 (FIG. 3). After recording, the sheet is discharged out through a recording sheet discharge portion 8 that is formed below the tray 6A.

A video signal input terminal 9 is provided in a front lower right portion of the housing 2. When a video camera or the like is connected to the video signal input terminal 9, video signals therefrom are taken in by the facsimile apparatus 1, and then recorded by the ink jet printer.

Although not shown, a back surface of the housing 2 is provided with a communication terminal for connection to a telephone line 52 (FIG. 3), and a terminal for connection to a connecting cable 54 (FIG. 3) to a personal computer (hereinafter, referred to as "PC") 53 (FIG. 3). When the PC 53 is present the result is a facsimile system 10. A handset for telephone talk or the like is provided on the left side of the housing 2.

The image scanner 19 constitutes an image reading device. The urgent mode button 3F constitutes an instruction device. The LCD 4 constitutes a notification device.

Figure 2:
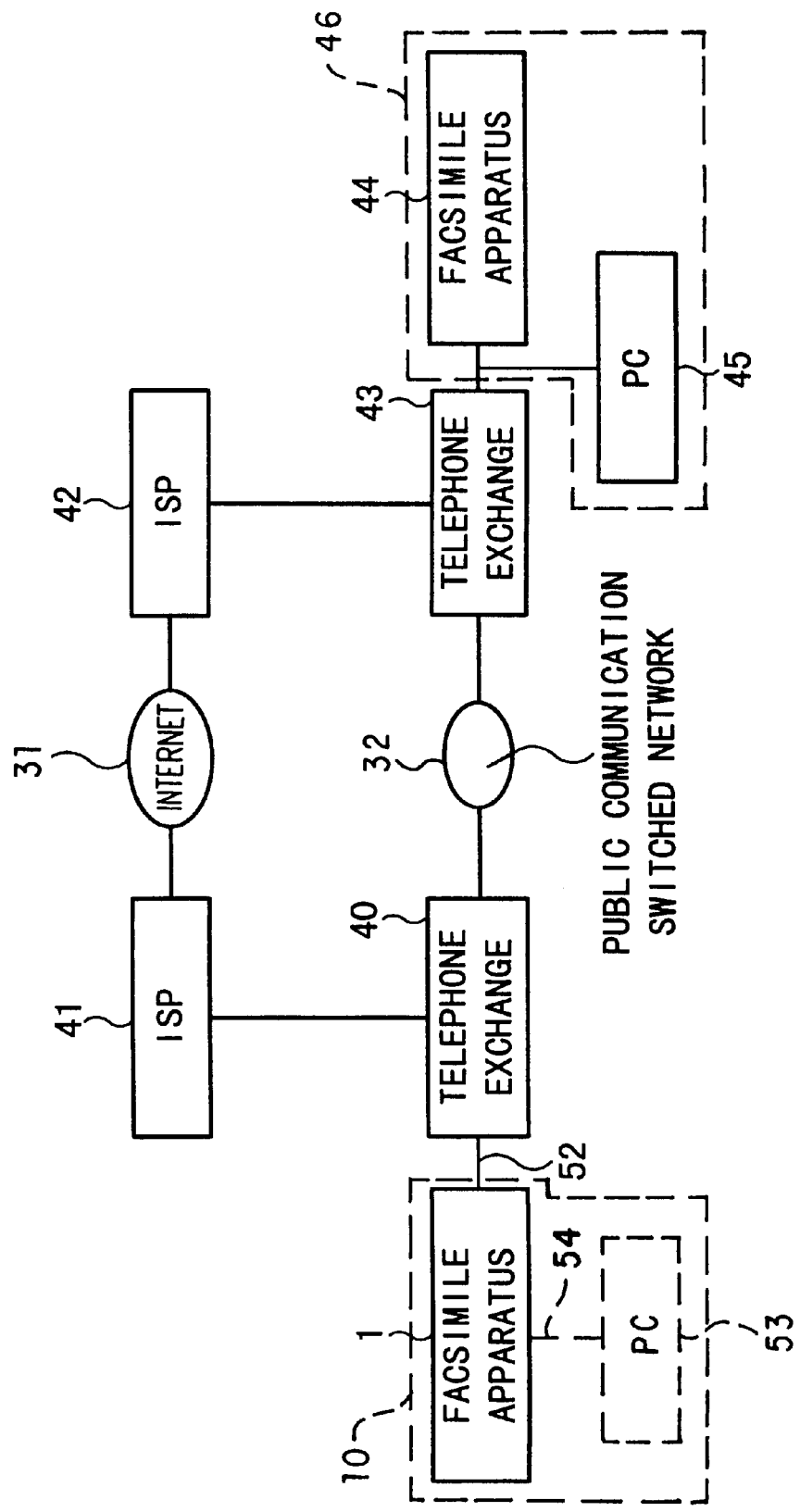
FIG. 2 illustrates the one possible communication route connecting the facsimile apparatus according to the embodiment and a facsimile apparatus on the receiver side.

The communication routes between the facsimile apparatus 1, or facsimile system 10, and a facsimile apparatus 44, or facsimile system 46, on a receiver, or addressee, side will be described with reference to the block diagram of FIG. 2.

The facsimile apparatus 1 is connected by the telephone line 52 to a telephone exchange 40 that covers an area in which the facsimile apparatus 1 is located. The telephone exchange 40 is connected to an internet 31 via an internet service provider (ISP) 41. A facsimile apparatus 44, and/or a personal computer (PC) 45 (when combined with a facsimile system 46), on the receiver side is connected to a telephone exchange 43 that covers an area in which the facsimile apparatus 44 is located. The facsimile apparatus 44 is connected to the internet 31 by an ISP 42.

That is, the facsimile apparatus 1, PC 53, or facsimile system 10 (facsimile apparatus 1 will be used for simplicity) is connected to the facsimile apparatus 44, the PC 45, or the facsimile system 46 (facsimile apparatus 44 will be used for simplicity) on the receiver side through a communication route via the internet 31, more specifically, from the facsimile apparatus 1, the telephone exchange 40, the ISP 41, the internet 31, the ISP 42 and the telephone exchange 43 to the facsimile apparatus 44.

The facsimile apparatus 1 is also connected to the receiver-side facsimile apparatus 44 through a public communication switched network 32 that is not via the internet 31. More specifically, from the facsimile apparatus 1, the telephone exchange 40, the public communication switched network 32 and the telephone exchange 43 to the facsimile apparatus 44.

That is, the facsimile apparatus 1 and the receiver-side facsimile apparatus 44 are interconnected by the two communication routes, that is, the communication route via the internet 31 and the public communication switched network 32.

The electrical arrangement of the facsimile apparatus 1 will be described with reference to the block diagram of FIG. 3.

The facsimile apparatus 1 is equipped with a facsimile unit FU and a printer unit PU. The two units are interconnected by an interface 30.

The facsimile unit FU has a CPU 11 that executes control of, at least, the switching between the communication route via the internet 31 and the communication route via the public communication switched network 32 and an image data transmission-reception control. The CPU 11 is connected to a facsimile control circuit 20. Furthermore, a ROM 12, a RAM 13 and an EEPROM 14 are also connected to the facsimile control circuit 20. The ROM 12 stores control programs 12A for the CPU 11 to execute various controls. The RAM 13 temporarily stores facsimile numbers and mail addresses inputted by operating the numerical keys 3A, image data read from a document by the image scanner 19, and other data directed to operations of the facsimile unit FU to be discussed below.

The EEPROM 14, which is used in this description to provide a writable, permanent storage device (permanent meaning data is retained in the storage medium when the apparatus with which used is without power) stores, in a re-writable manner, e-mail addresses and/or facsimile numbers in correspondence to the names of the addressees and/or number holders (receivers) in a priority order. The data stored in the EEPROM 14 is retained even after the facsimile apparatus 1 is powered off. Other storage medium having similar capabilities could be used.

The facsimile apparatus 1 is also equipped with an NCU 15 that sends dial signals out to the telephone line 52 and answers a call signal from the telephone line 52. The NCU 15 is connected to a modem 16 for transmission and reception of image data read by the image scanner 19 or provided from another source. Also connected to the facsimile control circuit 20 are a encoder 17 that encodes the image data read by the image scanner 19, or from the other source, for data compression, a decoder 18 that decodes coded data, such as received image data, and a document sensor 70 that detects a document set on the document setting portion 5. A voice circuit 28 for operating a buzzer 29, provided in the facsimile apparatus 1, is also connected to the facsimile control circuit 20.

The printer unit PU has a printer control circuit 76 that controls the printer 26. The printer 26 may be of any known type, such as thermal laser and ink jet, but in the preferred embodiment is an ink jet printer and will be described as such. The printer control circuit 76 is connected to a CPU 71 that executes programs for controlling the ink jet printer 26. The printer control circuit 76 is also connected to a ROM 72 storing programs that are executed by the CPU 71 and necessary predetermined data, a RAM 73 including a work memory that is used during operation of the CPU 71 and a print memory for storing print data, a PC interface 74 for connection to the PC 53, a character generator (CG) 75 storing vector fonts of characters and the like for printing, and the ink jet printer 26, which performs printing by ejecting ink droplets onto a recording sheet.

In this embodiment, the PC interface 74 is a parallel interface according to the Centronics standards. The facsimile apparatus 1 transmits data to and receives data from the PC 53 through the connecting cable 54 connected to the PC interface 74.

Figure 4:
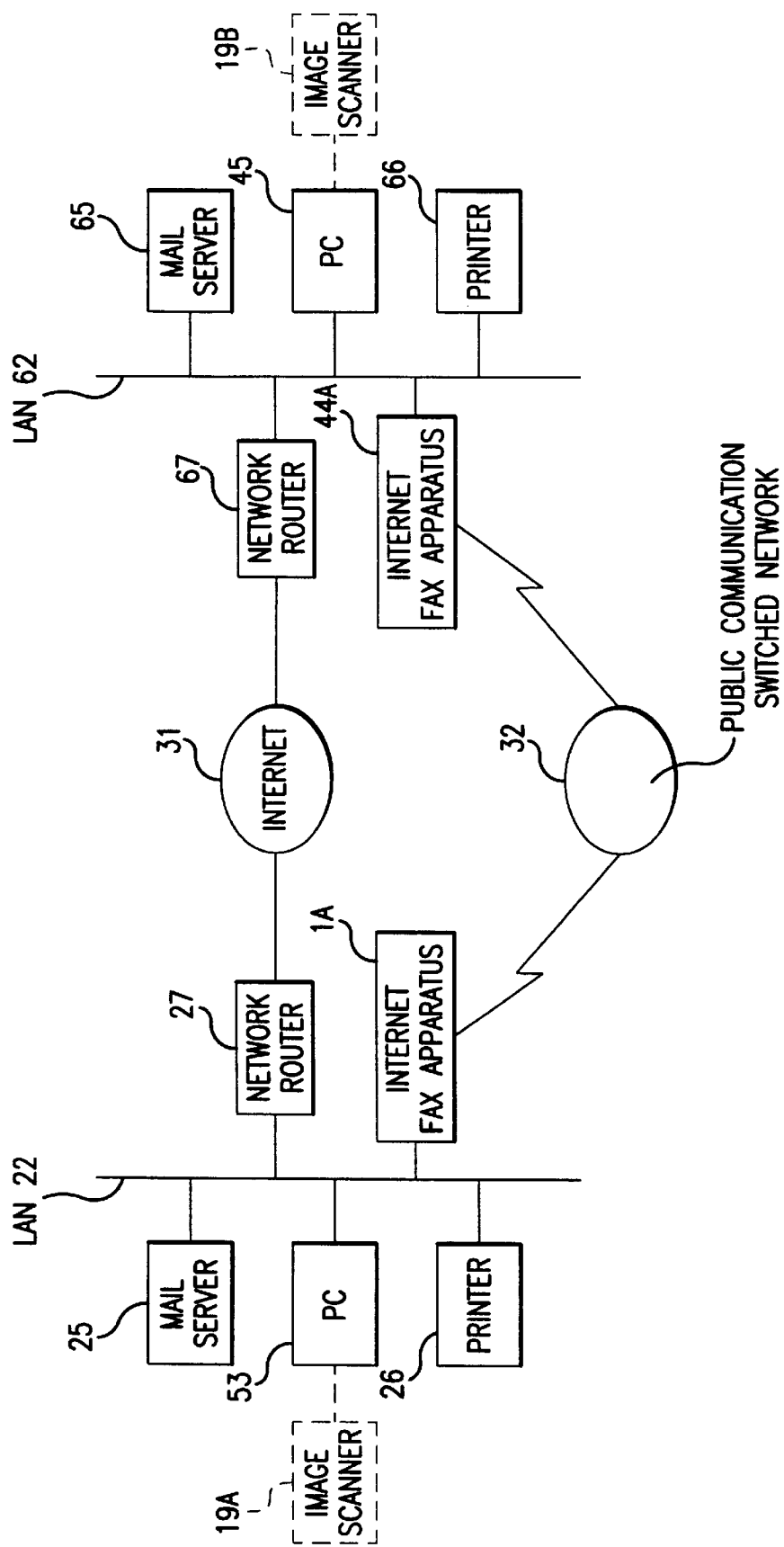
FIG. 4 is a second possible communication route connecting the facsimile apparatus according to a second embodiment of the facsimile apparatus and a facsimile apparatus on the receiver, or addressee, side.

A second embodiment employing a slightly different communication route structure is shown in FIG. 4. Where the functionality of an element is unchanged the same reference numbers are used as found in FIG. 2.

The internet facsimile apparatus 1A of the second embodiment is connected to a PC 53 (which may be connected to an image scanner 19A), a printer 26, a mail server 25 and a network router 27 via a local area network (LAN) 22. Moreover, in the present embodiment, a similar type of internet fax apparatus 44A is assumed as an apparatus which is able to perform facsimile communications with the internet fax apparatus 1A. The internet fax apparatus 44A is connected to a PC 45 (which may be connected to an image scanner 19B), a printer 66, a mail server 65 and a network router 67 via a LAN 62, i.e., it is similar to the internet fax apparatus 1A. Also, the internet fax apparatus 1A and the internet fax apparatus 44A have structures that are capable of performing facsimile transmission through the internet 31 via the network routers 27,67 that are connected to the LANs 22,62, respectively.

Figure 5:
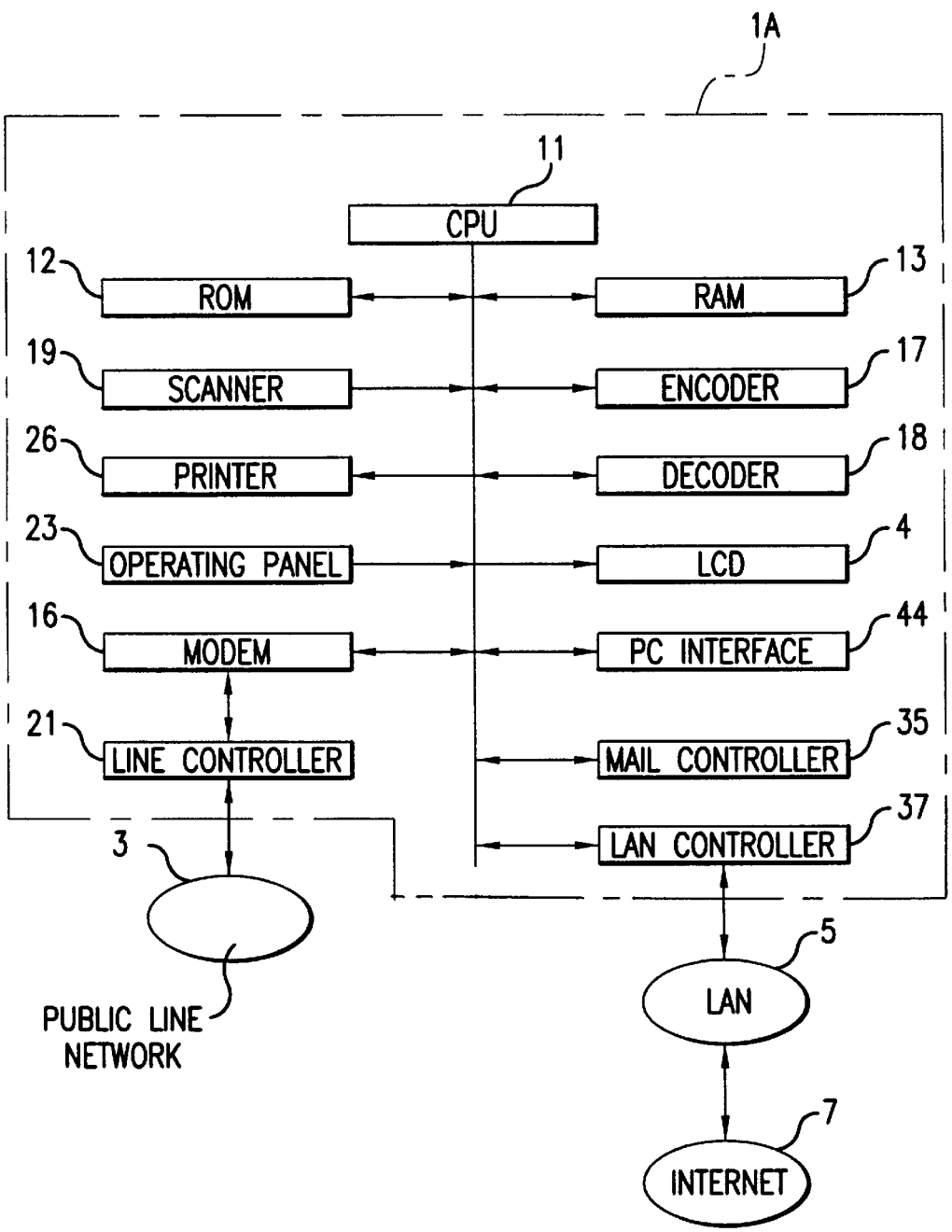
FIG. 5 is a block diagram of a main electrical arrangement of the facsimile apparatus of the second embodiment using the communication route of FIG. 3.

The structure of the internet facsimile apparatus 1A will be explained using the block diagram of FIG. 5. The internet facsimile apparatus 1A comprises a CPU 11, a ROM 12, a RAM 13, a scanner 19, an encoder 17, a printer 26, a decoder 18, an operating panel 3, an LCD 4, a modem 16, a line controller (NCU) 15, a PC interface 74, a mail controller 36 and a LAN controller 37 as the main structural elements. Further, it is connected to the public communication switched network 32 via the modem 16 and the NCU 15, and also connected to the LAN 22 via the LAN controller 37.

Figures 6, 7:
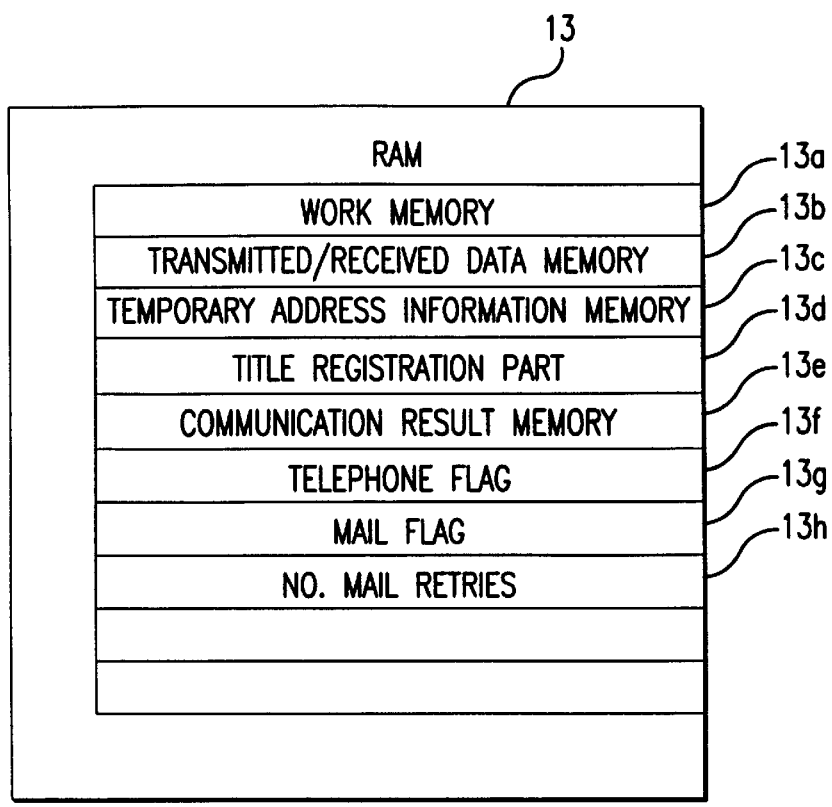
FIG. 6 illustrates the structure of a RAM of the invention.
FIG. 7 illustrates the content of the information stored in a writable permanent memory device.

The CPU 11 centralizes control of the apparatus 1A, and executes various kinds of control processing, such as facsimile transmission, address registration, title registration and communication control, in accordance with control programs 12A which are stored in the ROM 12. In the ROM 12, programs for control processing executed by the CPU 11, necessary data and the like are pre-stored. The RAM 13, as discussed with respect to the first embodiment, shown in FIG. 6, is used as a work memory 13a for facsimile transmission/receiving control and as a transmitted/received data memory 13b. It also is used in various operating modes, as a temporary address information memory 13c, a title registration part 13d, a communication results memory 13e, a telephone flag 13f that shows that facsimile communication has been performed via a public communication switched network, a mail flag 15g that shows that facsimile transmission has been performed via the internet, and a number of mail retries memory 13h. The RAM 13, as just described, is operable with both embodiments of the invention. The scanner 19 (19A) can be used to read a document prior to performing a facsimile transmission if the data is not input through the PC 53 or to provide supplementary data. In this embodiment, the encoder 17 executes encoding processing to convert the image data read in by the scanner 19 (19A) into image data in G3 compression format which is the facsimile format. Moreover, the decoder 18, conversely, decodes image data which is in the facsimile format. The printer 26 prints the image data which is decoded by the decoder 18 onto a recording medium. The operation panel 3 allows the input of various kinds of processing actions, such as the registration of addresses, the designation of an address, inputting and selecting of titles and instructing an output of a communication control report in the same manner as the first embodiment. The LCD 4 displays various messages, such as the operation order and error messages. Moreover, in the address designation, the registration of the address information or the like, the LCD 4 functions as the display of a one-touch button, that is, it can also function as a touch panel. This feature can also be used in the first embodiment.

The modem 16 performs facsimile transmissions through the public communications switched network 32 via the NCU 15. The NCU 15 transmits a dial signal to the public communications switched network 32, responds to a calling signal from the public communications switched network 32, and the like. The PC interface 74 is used when connecting a PC to the main apparatus 1.

When sending a facsimile transmission as e-mail, by the internet route, the mail controller 35, converts the binary image data which is encoded by the encoder 17 into the text coded image data, and also performs a format conversion of the image data of the facsimile format into an e-mail format, which is sendable as e-mail, by adding header information, such as the e-mail address of the addressee and, conversely, also performs the processing of inverse format conversion of image data in e-mail format which is received by the internet route, into image data in a facsimile format. The data which has been converted into image data of the facsimile format, by the mail controller 35, can be printed on recording medium after being encoded into image data which is capable of being output by the printer 26 or displayed on a display of the PC 53 after appropriate data conversion, or both. The LAN controller 37 controls the input and output when executing facsimile transmission using image data of the e-mail format through the LAN 22.

In both embodiments, the temporary address information memory 13c of the RAM 45, shown in FIG. 6, stores the address information in a format that can have both a telephone number and an e-mail address, and in a priority order for an addressee that is not a frequent recipient of transmissions, i.e., the data is not in the EEPROM or a permanent storage medium. Accordingly, when an addressee is capable of performing fax transmission/receiving through both the public communications switched network 32 and the internet 31, both the telephone number and the e-mail address can be registered at the same time with respect to the address name.

Either embodiment can operate in one of three modes. These modes are defined separately for ease of understanding but could obviously be combined in any shape or form in the invention. The first mode provides for, in a facsimile apparatus capable of transmitting data over two communication routes, establishing a priority of route of transmission. The second mode provides for automatic switching from the first communication route to the second communication route when communication across the first route is unsuccessful. Obviously, if a priority is established between routes of communication, then if the first priority route is a failure then there is automatic switching in the second mode to the second route. The third mode, which can be considered an urgent mode, provides for sequential communication across both communication routes if an address is provided for the. addressee at the end of each communication route. If only one address associated with one of the communication routes is provided, then that will be the communication route used and by default is the priority route.

The modes will be discussed in the order of input of data and defining a priority route, automatic switching from the first route, or priority route, to the second communication route and the urgent mode or transmission across both communication routes available.

The discussion of the three modes will be in the context of the first embodiment of the invention. However as is obvious, it is equally applicable to the second embodiment.

Figure 8:
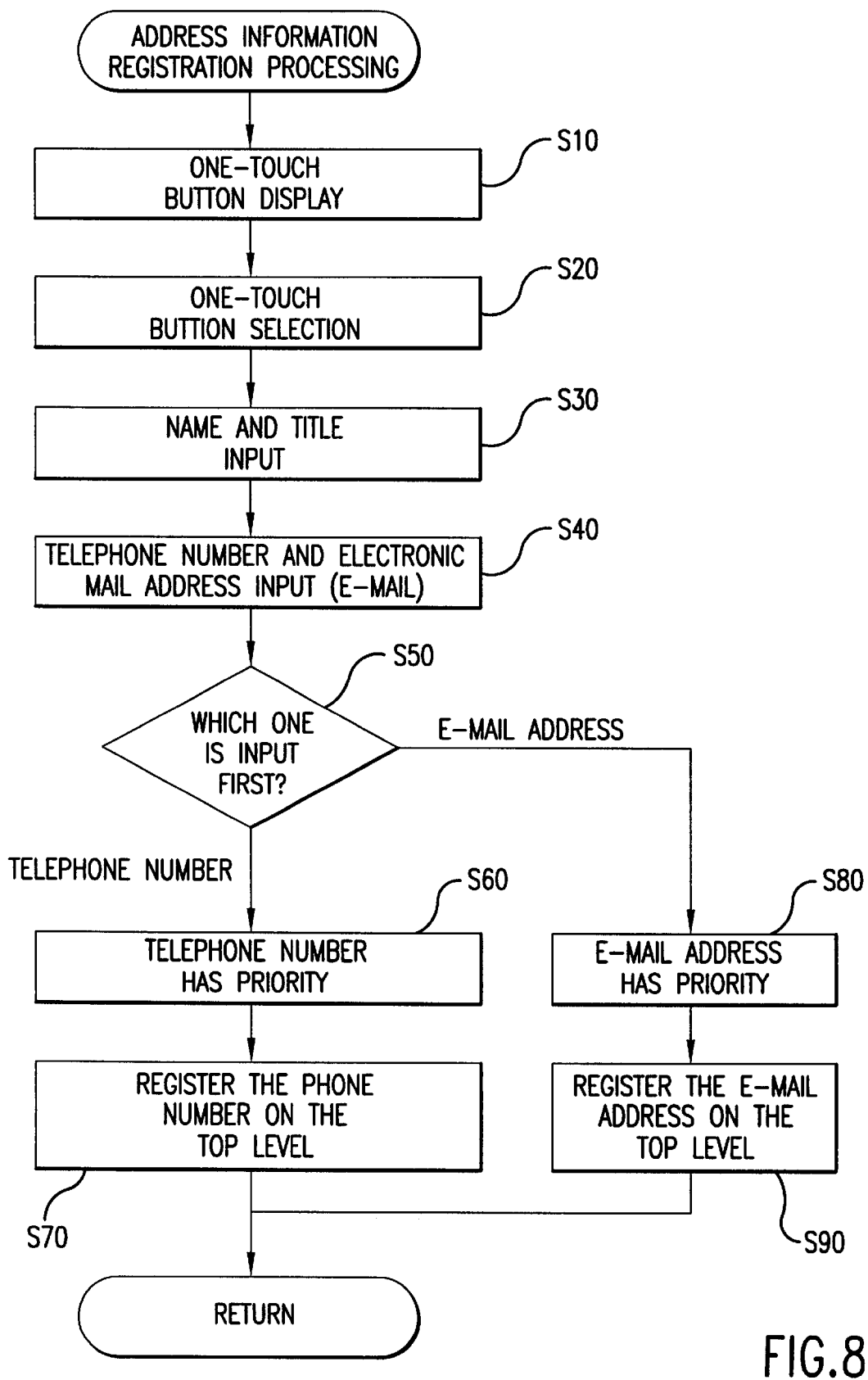
FIG. 8 is a flowchart illustrating the content of the address information registration processing which is executed in the first mode.

The establishment of the address information in the EEPROM 14, or a comparable memory unit, i.e., a registration process, will be explained with reference to FIGS. 7–11. This processing is executed when the address information registration processing is designated by using the control panel 3. In FIG. 8, when processing is started, a speed-call button 3D, or two numerical buttons 3A, identifying a corresponding address name position is displayed on the LCD 4 (S10). At this time, all of the speed-call buttons that cannot be displayed on the LCD 4, thus another position can be selected by inputting a number using the numerical keys 3A.

When the LCD 4 functions as a touch screen, then a portion of the available speed call designators are displayed. Other designators can be displayed using the scroll buttons 3H. The user selects one of the designators that are displayed on the LCD 4 (S20) by touching the designator, on the touch screen, of the address information which is to be registered. If the designator has been identified using a speed call button 3D, or the numerical keys 3A, processing skips step S20 as the functionality of steps S10 and S20 has been combined. Then, a name or title to specify the addressee, or receiver, such as the name of the person or the company name, is input into the column that corresponds to address name for the selected speed call number 7 of FIG. 7 (S30). Then, one or both of the telephone number and e-mail address of the fax apparatus for the name is input (S40). The input method could be via the numerical keys 3A and scroll buttons 3H to enter letters or other known methods.

At this time, it is evaluated whether the telephone number is input first or the e-mail address is input first (S50). When the telephone number is input first, the priority order is set on the telephone number as the normal route for the facsimile transmission to the addressee (S60) and the telephone number is registered on the priority level side in the EEPROM 14 (S70). On the other hand, when the e-mail address is input first, the priority order is set on the e-mail address as the normal route of facsimile transmission to the addressee (S80), and the e-mail address is registered on the priority level side, having the higher priority order, in the EEPROM 14 (S90). Further, as is easily understood, direct entry of data using the operation panel can create a single addressee set of data in the temporary addressee information memory 13c to be used for facsimile transmission.

Figure 9A:
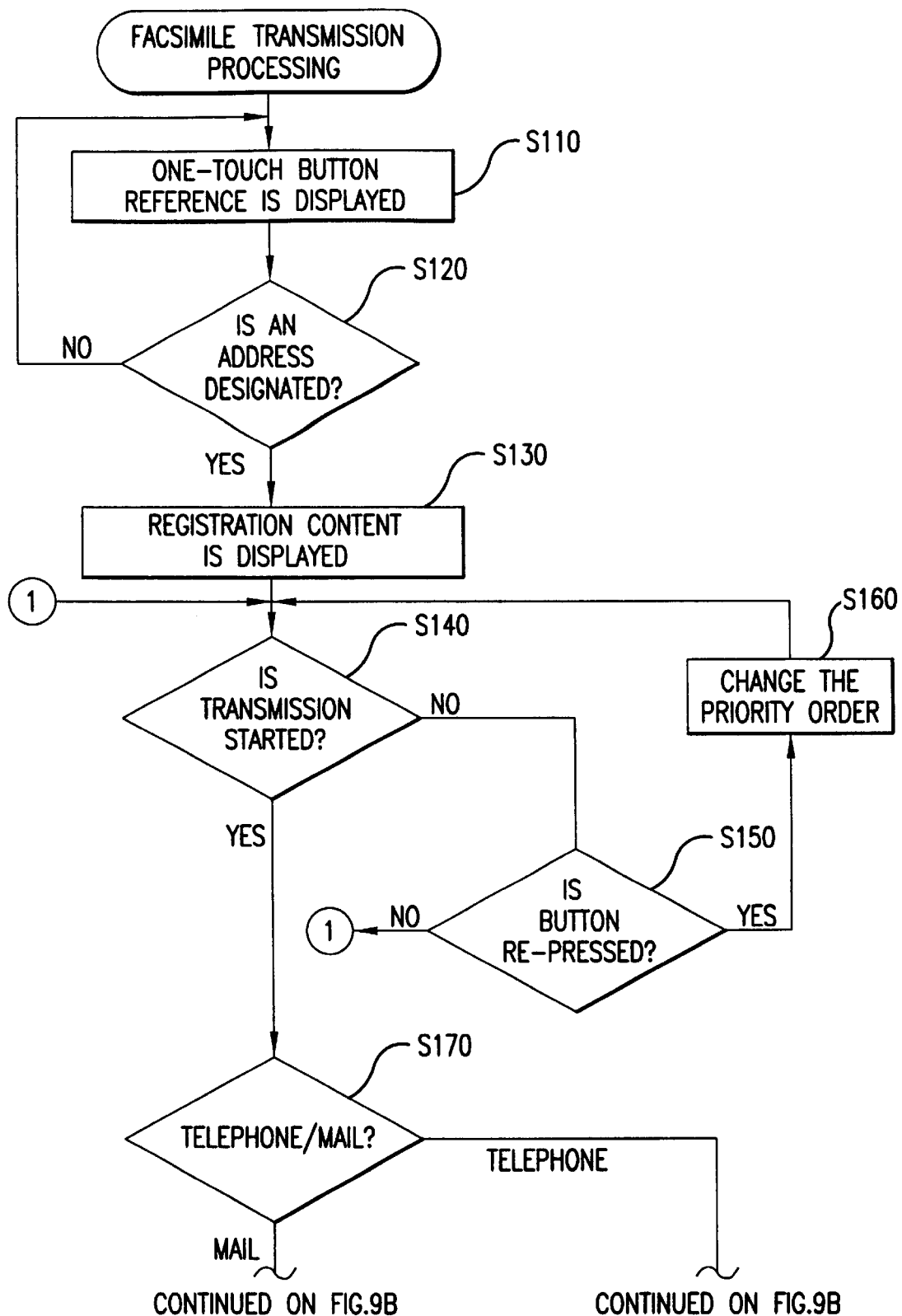
FIGS. 9A and 9B are a flowchart illustrating the content of the fax transmission processing which is executed in the first mode.
Figure 9B:
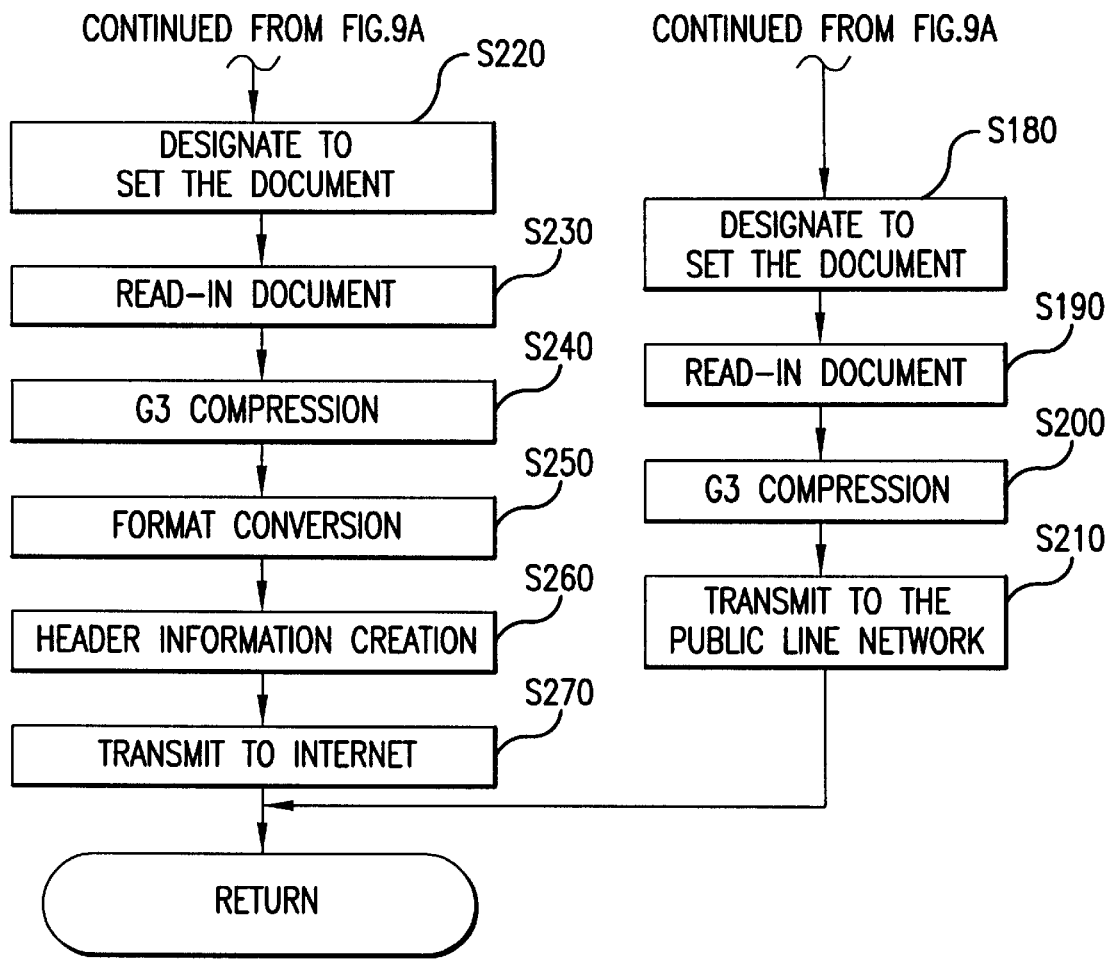
Figure 11:
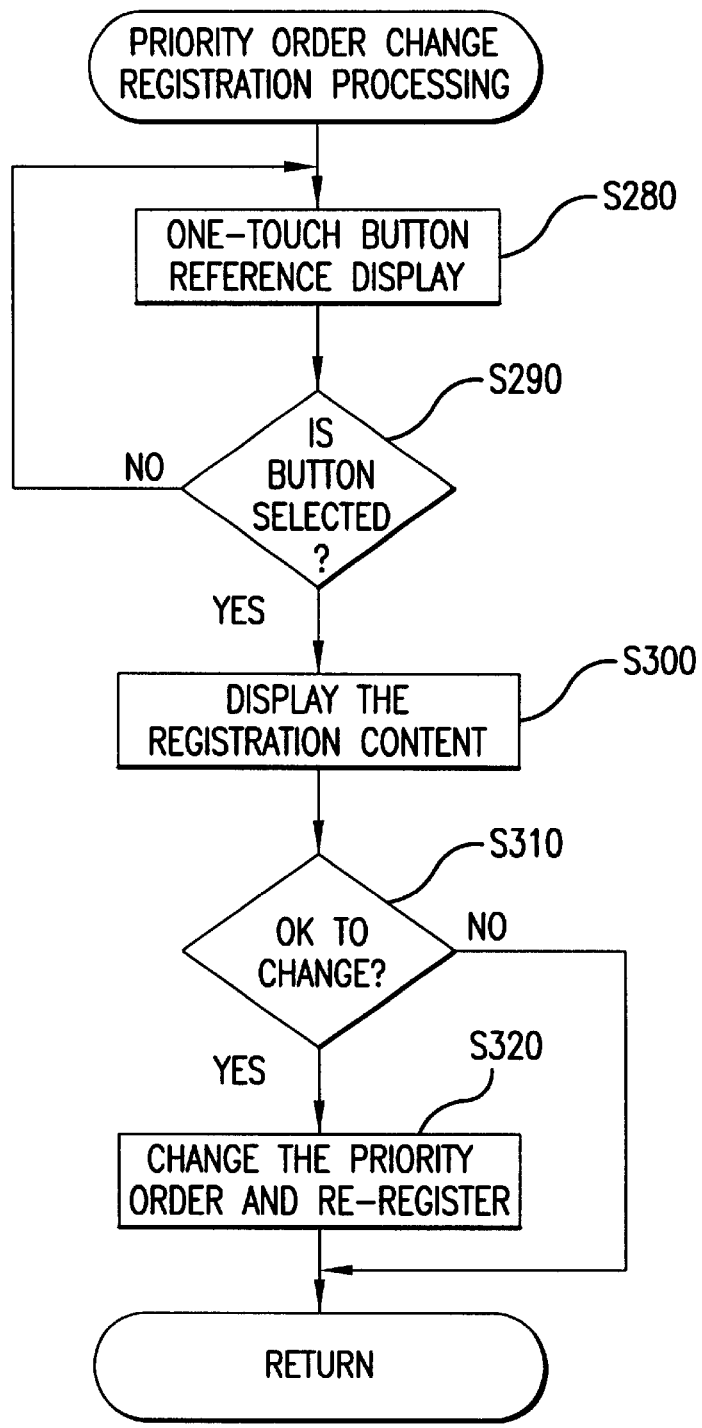
FIG. 11 is a flowchart illustrating the content of the priority order changing processing which is executed in the first mode.

In this mode, where only the priority order is established, facsimile transmission processing is as follows. The processing is shown in the flowchart of FIG. 9 and is started when a facsimile transmission is designated and input using the operation panel 3.

Either the LCD 4-touch screen is activated (S110), and the program waits for a selection by the user using the LCD 4, or processing starts at step S120 by use of a speed call button 3D or the numerical keys 3A (S120). The operator designates the address by pressing one of the one-touch buttons on the LCD 4, the speed call buttons 3D or the numerical keys 3A. Moreover, at this time, when the one-touch button of the addressee is not displayed on the LCD 4, the operator uses scroll buttons 3H to display the desired addressee.

When the addressee is thus designated, the registration content of the addressee is displayed on the LCD 4 (S130). At this time, for an addressee for which the telephone number is the priority, as shown in FIG. 10(A), the registration content is displayed in the order of the addressee name, the telephone number and the e-mail address. On the other hand, when the e-mail address is the priority for the addressee, as shown in FIG. 10(B), the registration content is displayed in order of the address name, the e-mail address and the telephone number. The operator can easily determine whether the selected addressee uses the public communication switched network as the normal route or uses the internet as the normal route by the display of this registration content.

After displaying the registration content of the addressee, the program awaits the pressing of the transmission start button 3b by the user (S140). If the one-touch button which is displayed on the LCD 4 is repressed by the user before the transmission start button 3b is pressed (S150:YES), the display position of the telephone number and the e-mail address is switched in the display content on the current LCD 4 (S160). Alternatively, a switch button can be provided on the operation panel 3. In such a case, if the display condition of FIG. 10(A) was displayed, the display switches to that of FIG. 10(B) when the one-touch button is pressed the second time.

Then, when the transmission start button 3b is pressed (S140:YES), the system evaluates which of the telephone number and the e-mail address is displayed first in the display of the registration content of the selected addressee at that time (S170). When the telephone number is displayed first, setting of the document is designated (S180), and the document is read-in by the scanner 19 (S190). The image data which is read in from the document is encoded into image data of G3 compressed format by the encoder 17 (S200), and the facsimile transmission is executed via the modem 16 and the NCU 15 to the addressee side facsimile system 46 through the public communication switched network 32 (S210).

On the other hand, when the e-mail address is displayed first, i.e., when the e-mail address is the top priority order, document setting is designated (S220), the document is read-in by the scanner 19 (S230), and the image data which is read in from the document is encoded into image data of G3 compressed format by the encoder 17 (S240). Up to this point, the processing is the same as when taking the public communication switched network route. However, image data of G3 compressed format cannot be transmitted through the internet 31 as e-mail. Therefore, the G3 format image data is input to a mail controller 35, and the format converted into text coded image data which is capable of being transmitted over the internet 31 (S250). Moreover, instead of the processing of S230–S250, it is acceptable to have a structure in which the data is read by the scanner 19 into a format which is capable of being directly transmitted over the internet 31. Moreover, in the mail controller 35, header information for the selected e-mail address, data which indicates the sender, necessary information to perform printout or a viewer display at the addressee side, and/or the like is created (S260). Then, the text coded image data to which the header information is attached is transmitted to the ISP 41, or a LAN controller 37, if appropriate, and transmitted over the internet 31 (S270).

Next, a process for changing the registered priority order in the registration contents of the EEPROM 14 will be explained. This processing starts according to the order which is shown in FIG. 7 when an input is performed to execute the priority order changing processing by the control panel 55.

First of all, a list of the one-touch buttons for which address information is currently registered is displayed on the LCD 4 (S280). The program awaits the selection of the one-touch button, among the one-touch buttons that are displayed, or scrolled to display, on the LCD 4, for which the change of the priority order is to be performed (S290). When the one-touch button or, alternatively, the addressee is selected using the speed call buttons 3D or numerical keys 3A, for which the change of the priority order is to be performed is selected (S290:YES), the registration content of the selected addressee is displayed on the LCD 4 (S300). Then, the system inquires whether it is desirable to change the priority order (S310), and when "YES" is input, the system performs the re-registration by changing the priority order of the telephone number and e-mail address that are registered for the addressee (S320). Moreover, when "NO" is input, the processing is terminated without performing the change of the priority order.

As explained above, according to the present embodiment, when registering the address information for an addressee, by determining whether the telephone number is input first or the e-mail address is input first, the information of whether the public communication switched network or the internet has priority for the normal facsimile transmission route to the addressee. Accordingly, when registering the addressee information, the facsimile transmission route which should have priority for the normal transmission can be registered as either the public communication switched network or the internet for every addressee for which speed calling is desired. As a result, at the time of facsimile transmission, the transmission route which should have priority is designated easily for every addressee with the simple operation of designating the transmission start key 3d after identifying the addressee.

Moreover, even though the priority transmission route at the time of facsimile transmission is registered, facsimile transmission using the other, or ancillary route, of the normal operation can be accomplished simply. Accordingly, the selection of the route which is used most often can be performed easily, and the operation of designating fax transmission by the inverse route of the normal operation is also easy.

In addition, the priority order which was previously registered can be subsequently changed. Therefore, the change in the priority order of transmission can be accomplished simply for an addressee when the communication circumstances change.

Although the above processing has been described using either a one-touch screen using the LCD 4 or by use of speed call buttons 3D and numerical keys 3A, the processing could be accomplished using either one of the two capabilities and not providing both in the facsimile apparatus. Further, methodologies for reordering the priority order for the communication routes found in the EEPROM 14 could be done by providing a switch key that is depressed upon identifying the addressee for which the priority order must be re-registered. Such a switch would result in a switch in the recorded data found in the EEPROM 14.

In a second mode, the EEPROM 14, as shown in FIG. 7, or the temporary address information memory 13c, as shown in FIG. 6, is structured to register addressee information that includes both a telephone number and an electronic mail address, which is used as a transmission address, with respect to speed call addressees or a one time addressee respectively. Therefore, when a receiver can receive facsimile transmissions from both the public communication switched network 32 and the internet 31, both the telephone number and the e-mail address can be registered for the same addressee.

Figure 12:
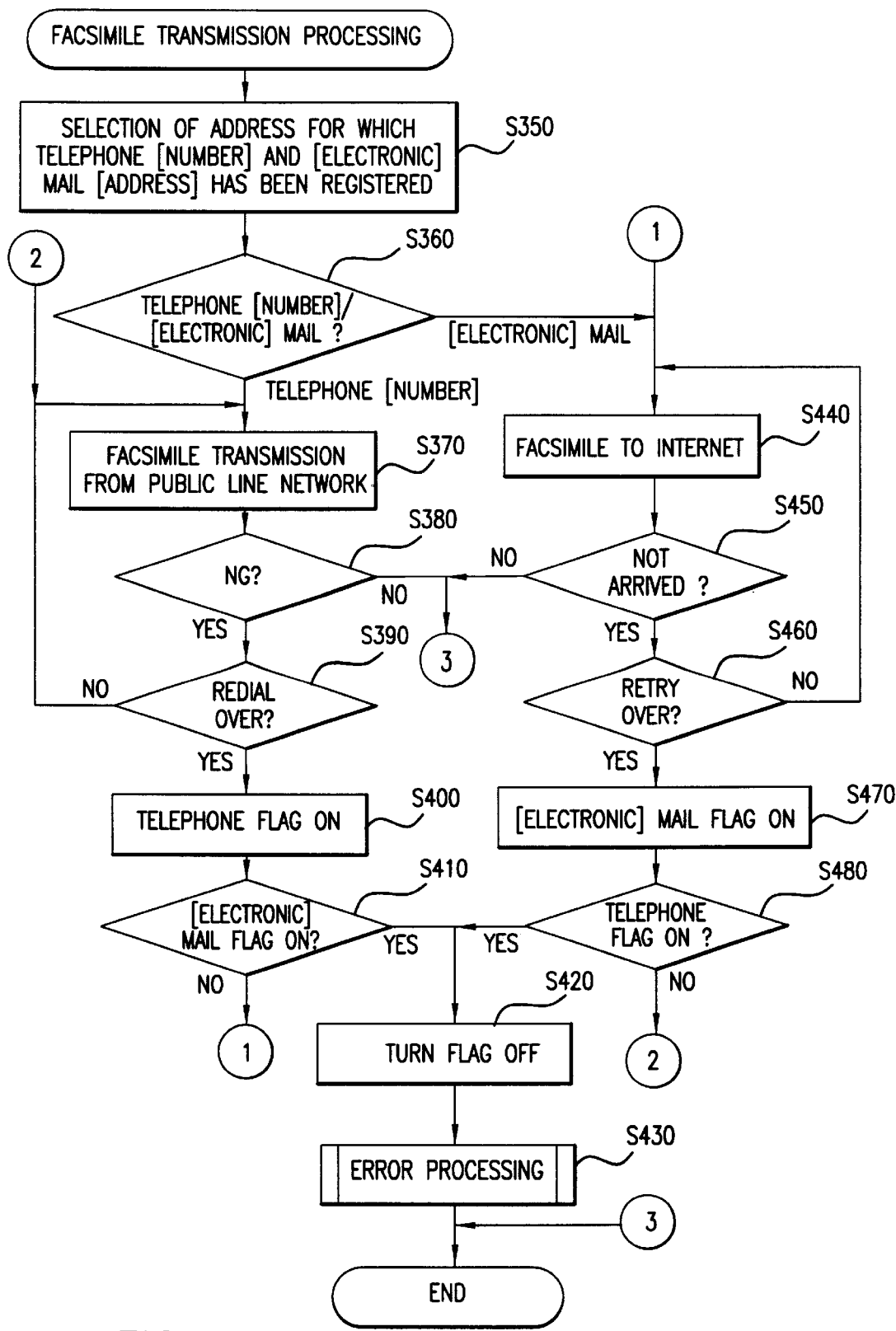
FIG. 12 is a flowchart illustrating the content of automatic retransmission processing performed in the second mode.

Next, the mode will be described, using the flow chart of FIG. 12, in which, for example, an addressee that has both a telephone number and an e-mail address, such as addressee 1 of FIG. 7, is indicated and facsimile transmission is performed by the facsimile system 10.

In this mode, first, the operator selects an addressee for which both a telephone number and a mail address are registered, such as addressee 1, through the operating panel 25 (S350). A selection is made as to whether transmission will be made to the telephone number or to the e-mail address (S360). If used in conjunction with the priority order mode, selection of the addressee will result in selection of the higher priority of the telephone number and the e-mail address. When the telephone number is selected (S360: telephone), facsimile transmission is performed via a public communication switched network to the telephone number that is registered for the addressee that was selected in S350 (S370). Specifically, a calling signal is output via the modem 16 and NCU 15, and after waiting for a response signal, processing is performed to transmit the facsimile data.

If the facsimile transmission through the public communication switched network fails (S380: YES), it is confirmed whether a set number of redials allowed when retransmitting the facsimile communication via the public communication switched network has been exceeded (S390). If it is within the set number of redials allowed (S390: NO), the processing of S370 and after is repeated. The number of redials is established according to the regulations of each country and is pre-stored in the ROM 12.

On the other hand, if the number of allowed redials is exceeded (S390: YES), the telephone flag 13f of the RAM 13, which shows that facsimile transmission has been performed via the public communication switched network, is turned ON (S400), and it is then determined whether the mail flag 13g of the RAM 13, which shows that the facsimile transmission via the internet has been performed, is ON (S410). If the mail flag 13g is OFF (S410: NO), the program switches to facsimile transmission via the internet, taking the mail address registered for the addressee selected in S350 as the address to which to transmit, and performs facsimile transmission via the internet as e-mail (S440). Thereafter, if it is determined that the e-mail has not been received even though a specified time period has elapsed (S120: YES), when facsimile transmission via the internet has been repeated, it is determined whether the number of retries that is set for the internet for the case of non-delivery has been exceeded (S460). When the number of retries has not been exceeded (S4630: NO), the program returns to S440 and again performs facsimile transmission via the internet. The number of retries via the Internet can be set independently by the user, regardless of the number of redials allowed by the public communication switched network. The setting member is stored in the number-of-internet-retries setting area 13h of the RAM 13.

When facsimile data does not correctly arrive at a receiver even though facsimile communication has thus been repeatedly attempted via the internet (S460: YES), the mail flag 13g is turned ON (S470), and it is determined whether the telephone flag 13f is turned ON (S480). In this case, since the telephone flag 13f is ON (S480: YES), the telephone flag 13f and the mail flag 13g are turned OFF (S420), and a message indicating that transmission of the facsimile could not be performed through either the public communication switched network or the internet is output on a recording medium by the printer 26 (S430) or, alternatively, a message is displayed on the LCD 4.

In S360, when a transmission to the e-mail address is initially selected, the facsimile transmission is performed via the internet to the e-mail address registered for the addressee selected in S350. Thereafter, if e-mail indicating delivery is not received even though a specified time has elapsed, it is determined that the image information has not been delivered (S450: YES), and when the facsimile transmission has been retransmitted via the internet, it is confirmed whether the number of retries allowed after non-delivery that is set for the internet is exceeded (S460). When the allowed number of retries is not exceeded (S460: NO), the program returns to S440 and once again performs facsimile transmission via the Internet. Furthermore, the user can set the allowed number of retries via the internet independently of the allowed number of redials via a public communication switched network as previously discussed.

Thus, when facsimile data has not correctly arrived at the addressee even though the facsimile communication via the internet has been repeated (S460: YES), as described above, the mail flag 13g is turned ON (S470), and it is determined whether the telephone flag 13f is ON (S480). In this case, because the telephone flag 13f is OFF (S480: NO), the program switches to facsimile transmission via the public communication switched network, and the processing of S370 and after is performed.

As described above, according to this mode, when a facsimile transmission is to go to an addressee having both a telephone number and an e-mail address, if the facsimile information cannot be made to arrive at the receiver via one of the public communication switched network and the internet, the program switches to the other and retransmits the facsimile information. Therefore, the facsimile arrival rate at the addressee is improved. Additionally, since the setting of the number of retries via the Internet can be freely set by the user independently of the set number of redials via the public communication switched network, the facsimile arrival rate can be dramatically improved by setting a large number of retries via the Internet.

Next, an enhancement of or variation to the mode will be described. The second embodiment, shown in FIG. 13, is structured for the structure when the facsimile system 10 is connected to a receiving facsimile system 46 via the internet 31, it is also connected via a server 41.

Figure 13:
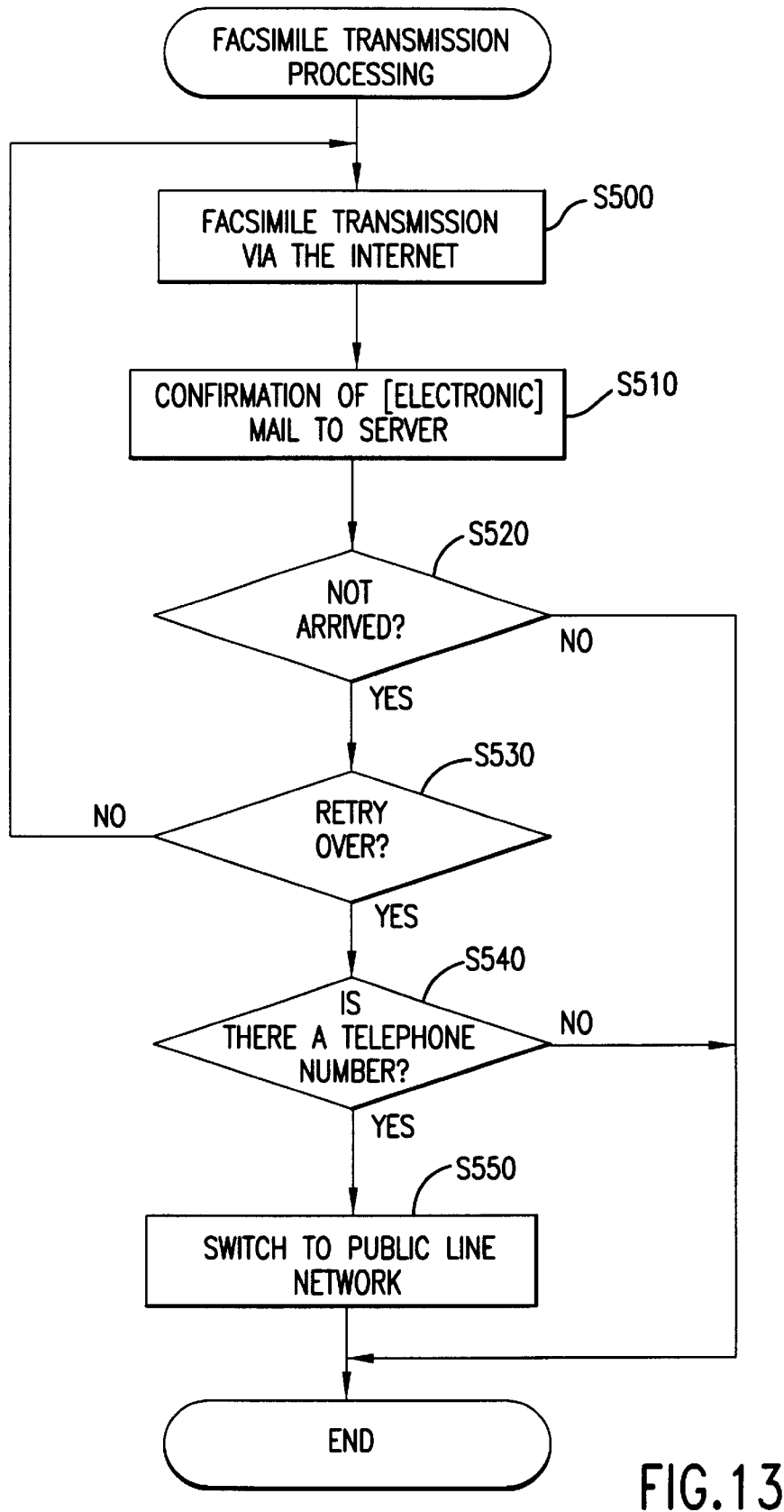
FIG. 13 is a flowchart showing the content of automatic retransmission processing performed in the second mode.

When the facsimile system 10 of this enhancement, as shown in FIG. 13, performs facsimile transmission via the internet (S500), periodically goes to the server 41 to confirm whether the e-mail to the facsimile system of the addressee has been received (S510). When an e-mail indicating delivery has not arrived at the server 41 even though a specified time period has elapsed, non-delivery is determined (S520: YES), and it is confirmed whether the number of retries set for the internet when re-transmitting the facsimile information has been exceeded (S530). When the set number of retries has not been exceeded, the program returns to S500 and once again performs facsimile transmission via the internet. Moreover, the structure may be such that the number of retries via the Internet, as discussed previously, can be independently set by the operator regardless of the number of redials allowed via the public communication switched network. The number may be stored in the specified area 13h of the RAM 13. If no number is set in this mode, the default number is 1.

If facsimile data does not correctly arrive at the receiver even though facsimile communication via the internet is repeated, it is determined whether telephone information is also registered for the addressee (S540). If a telephone number is also registered (S540: YES), the program switches to facsimile transmission via the public communication switched network using the telephone number (S550).

As described above, according to the enhancement or variation to the second mode, it is automatically confirmed whether a delivery notification has been received at the server 41. If a delivery notification has not arrived, even though a specified time period has elapsed, retransmission processing is automatically performed. Therefore, the facsimile arrival rate can be improved without imposing an additional operation on the operator. Furthermore, when facsimile transmission via the internet become difficult, the program switches to facsimile transmission via a public communication switched network. Therefore, the facsimile arrival rate can be dramatically improved.

Although the second mode has been described, the mode is not limited to two variants. Other variants may be possible within the scope of the invention. For example, in a system that returns an e-mail indicating non-delivery when the facsimile data does not correctly arrive at the addressee when a facsimile transmission is performed via the internet, the addressee may be made such that no confirmation is made concerning the presence or absence of mail indicating delivery, but rather a confirmation is made regarding the presence or absence of mail indicating non-delivery.

The content of a communication control operation executed by the CPU 11 in the third mode will be described with reference to the flowcharts of FIGS. 14–16.

In the description below, it is assumed that an operator of the facsimile apparatus 1, a facsimile system 10, transmits image data to the addressee identified by registration No. 1 shown in FIG. 7 in an urgent mode.

Figure 14:
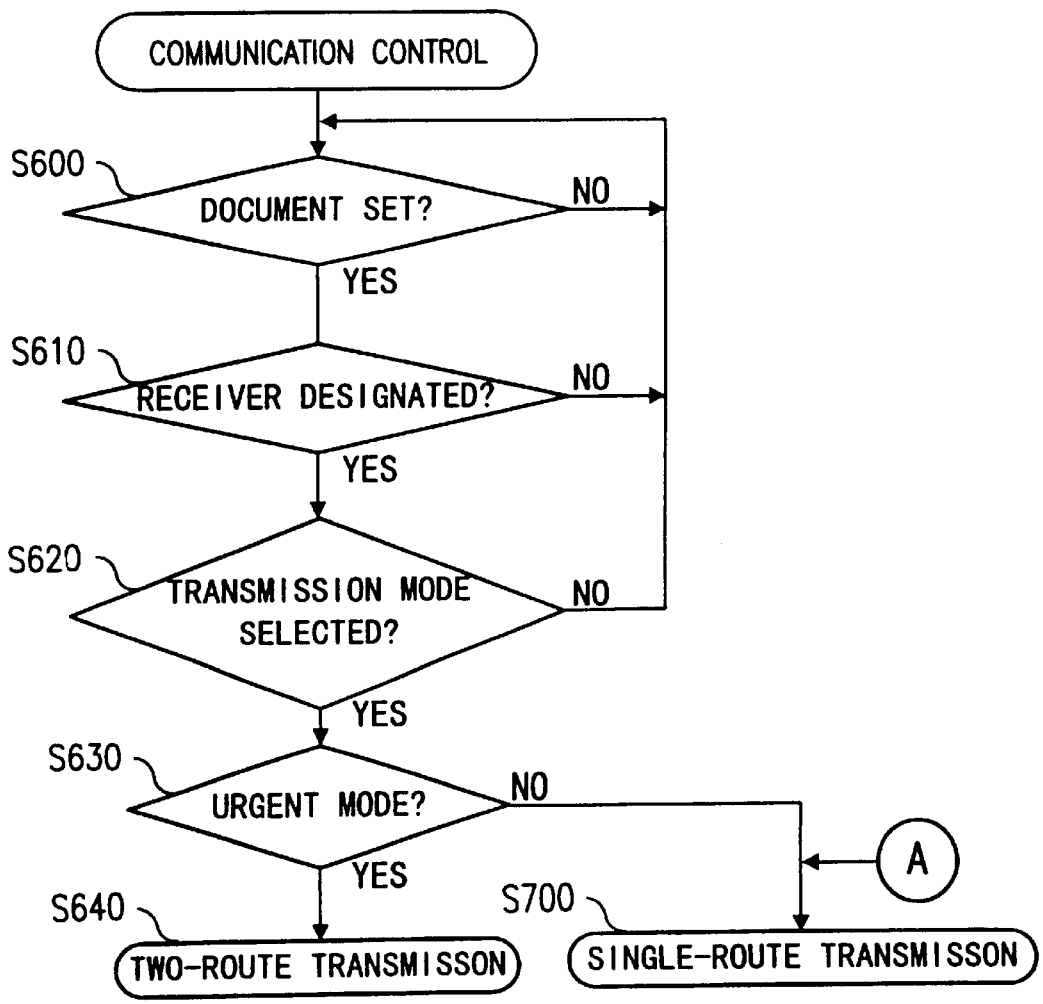
FIG. 14 is a flowchart illustrating a communication control operation executed by a CPU provided in the facsimile apparatus.

In S600 of FIG. 14, the CPU 11 determines whether a document is set on the document setting portion 5 on the basis of a detection signal from a document sensor 70. If the determination in S600 is YES, the CPU 11 determines in S610 whether an addressee has been designated by operating the numerical keys 3a, a speed-call button 3D or the one-touch button of the LCD 4. If the determination in S610 is YES, the CPU 11 determines whether a transmission mode, normal or urgent, has been selected. If the determination in S620 is YES, the CPU 11 determines in S630 whether the transmission mode selected is the urgent mode that has been selected by pressing the urgent mode button 3F.

In S630, the CPU 11 also determines whether it is possible to transmit to the designated addressee through the two communication routes, that is, the communication route via the internet 31 and the communication route via the public communication switched network 32.

If the operator presses the urgent mode button 3F, operation proceeds to S640, where the CPU 11 executes a two-route transmission operation.

The content of the two-route transmission operation executed by the CPU 11 will be described with reference to the flowchart of FIG. 15 using the system of FIG. 2.

Figure 15:
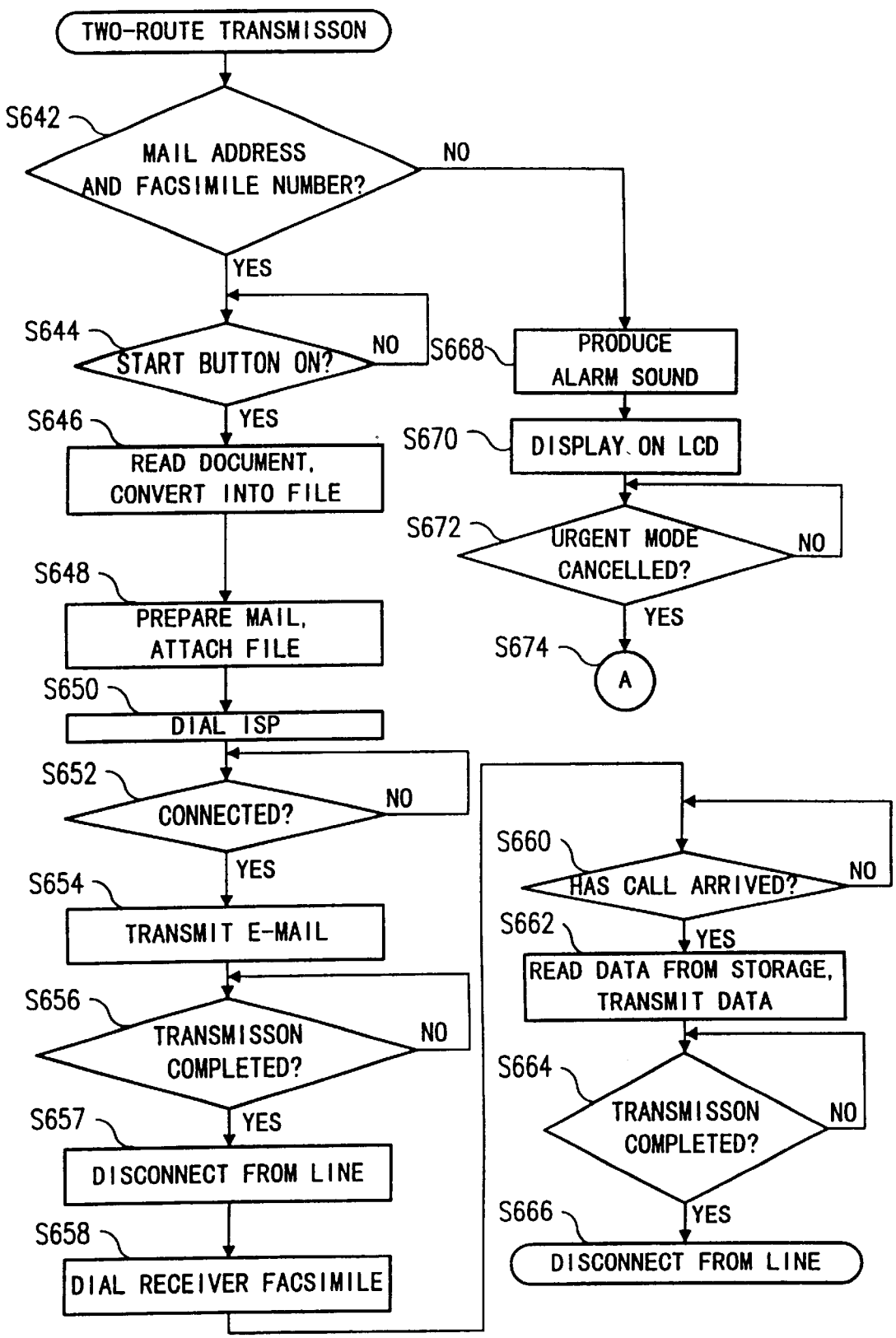
FIG. 15 is a flowchart illustrating a two-route transmission operation executed by the CPU according to a third mode.
Figure 16:
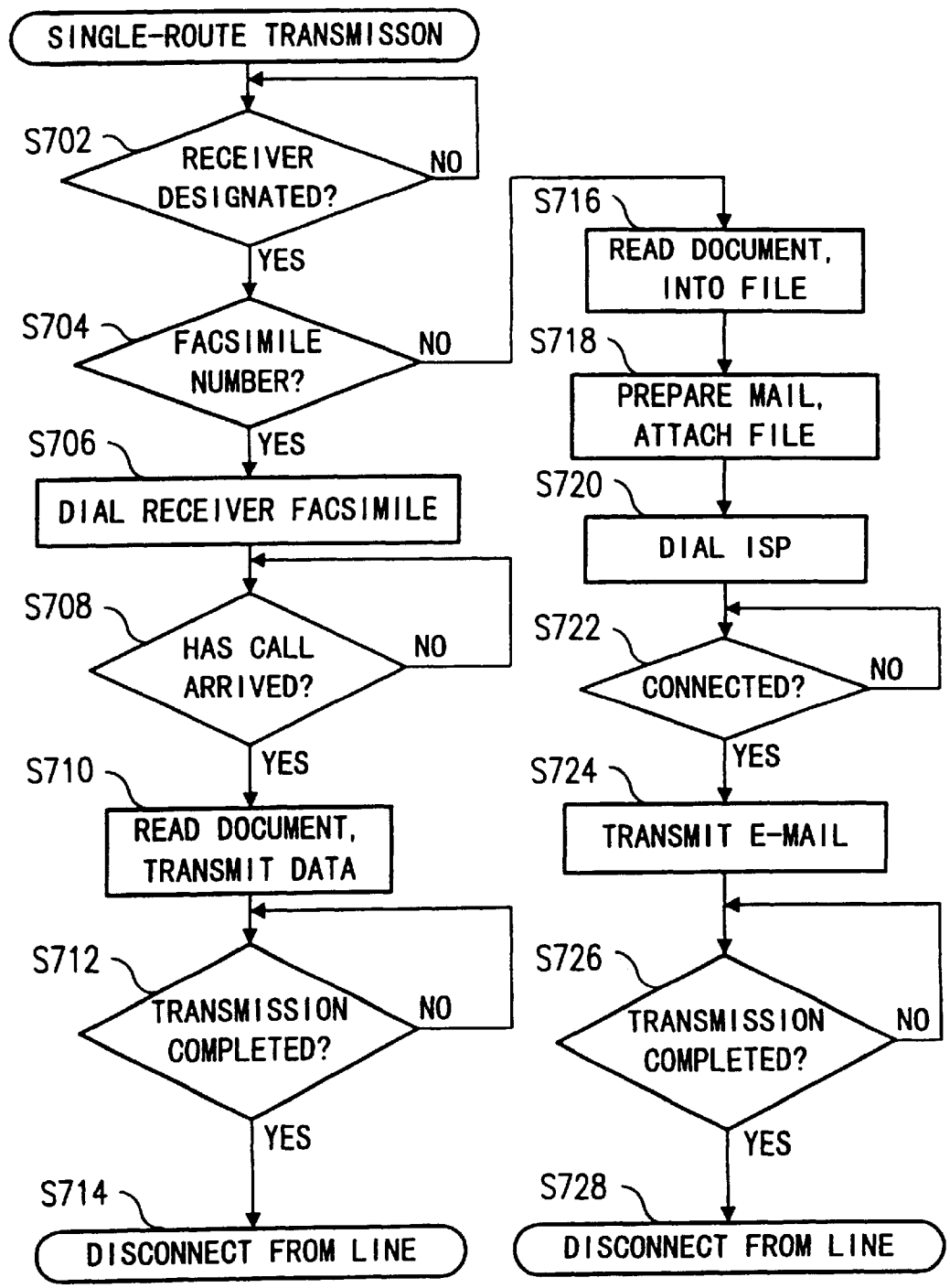
FIG. 16 is a flowchart illustrating a single-route transmission operation executed by the CPU according to the third mode.

In S642 of FIG. 15, the CPU 11 determines whether an e-mail address and a facsimile number for the designated receiver are stored in the EEPROM 14. In the example being used, the operator has designated the addressee of registration No. 1 to be the recipient, as mentioned above. An e-mail address and a facsimile number for the addressee identified as registration No. 1 have been registered as shown in FIG. 7. Therefore, the determination in S642 is YES, and operation proceeds to S644. In S644, the CPU 11 determines whether the start button 3b has been pressed. If the determination is YES, the operation proceeds to S646, where the CPU 11 causes the image scanner 19 to read image information from the document, stores the image data in RAM 13, and converts the data into an image file of the tag image file format (TIFF).

After the conversion into the image file, the CPU 11 prepares an e-mail to be transmitted to the addressee of registration No. 1, and attaches the image file to the e-mail in S648. Alternatively, if also in the priority mode, the first transmission in urgent transmission mode would go via the public communication switched network. However, for a simple urgent mode case, the following description applies. Modification of the processing to use the prior order is within the knowledge of those skilled in the art in light of this disclosure.

Subsequently, the CPU 11 causes the NCU 15 to dial the ISP 41 in S650, and determines in S652 whether the connection to the ISP 41 is established. If the connection is established (YES in S652), the CPU 11 transmits the e-mail together with the image file to the ISP 42 via the ISP 41 and the internet 31 in S654. The ISP 42 receives and stores the e-mail into a storage area specified by the mail address indicated in the e-mail.

Subsequently in S656, the CPU 11 determines whether the transmission of the e-mail has been completed. When it has been completed (YES in S656), the CPU 11 temporarily disconnects from the communication line through the internet 31 in S657, and dials the facsimile apparatus 44 or facsimile system 46, of the addressee, in S658. After detecting the arrival of the call at the addressee's facsimile apparatus 44 (YES in S660), the CPU 11 transmits, in S662, the image data stored in the RAM 13 to the facsimile apparatus 44, via the telephone exchange 40, the public communication switched network 32 and the telephone exchange 43, that is, through the communication route that is not via the internet 31. Subsequently in S664, the CPU 11 determines whether the transmission of the image data has been completed. If the determination is YES, the CPU 11 disconnects from the public communication switched network line in S666.

At the addressee side, the e-mail transmitted in S654 can also be received by operating the PC 45 to access the ISP 42. The image file attached to the e-mail is decompressed and displayed on the CRT or LCD, or other display device of the PC 45, so that the addressee can see the content of the received document. The facsimile apparatus 44 at the addressee receives the image data transmitted thereto in S662, and records the received data on a recording medium, and discharges the recording medium, so that the addressee can see the content of the document.

Although in the above description, the e-mail transmission is followed by the facsimile transmission, this sequence may also be reversed as noted above.

In a case where an addressee who does not have an e-mail address registered, as in the case of the addressee listed as registration No. 2 in FIG. 7, is designated by using a speed-call button 3D, the CPU 11 makes a negative determination in S642, and produces an alarm sound by operating the buzzer 29 in S668, and displays, in S670, an error message, for example, "MAIL ADDRESS IS NOT REGISTERED", "URGENT MODE IS NOT AVAILABLE FOR THIS RECEIVER", CANCEL URGENT MODE" or any similar warning message.

That is, the CPU 11 informs the operator that it is not possible to use the two communication routes for transmission of the image data to the addressee without a registered mail address, for the addressee identified by registration No. 2. A similar processing would take place for an addressee without a registered telephone number.

Subsequently in S672, the CPU 11 determines whether the urgent mode is canceled by pressing the urgent mode button 3f again. If the determination is YES, the operation goes to S674, where the CPU 11 executes a single-route transmission operation (S700 of FIG. 14). The single-route transmission operation is executed as illustrated by the flowchart of FIG. 16.

In S702, the CPU 11 determines whether an addressee has been designated. If an addressee has been designated (YES in S702), the CPU 11 determines in S704 whether a facsimile number is stored in the EEPROM 14 corresponding to the designated addressee. If the determination in S704 is YES, the CPU 11 dials the facsimile apparatus 44 at the addressee in S706.

Subsequently in S708, the CPU 11 determines whether the call has arrived at the facsimile apparatus 44 at the addressee. After detecting the arrival of the call (YES in S708), the CPU 11 causes the image scanner 19 to read image information from a document, and transmits the image data to the facsimile apparatus 44 at the addressee in S710. After detecting completion of the transmission (YES in S712), the CPU 11 disconnects from the communication line in S714.

If the name of the designated receiver is stored with a mail address, but not a facsimile number, a NO determination is made by the CPU 11 in S704, and processing proceeds to S716. In S716, the CPU 11 converts the read image data into an image file. In S718, the CPU 11 prepares an e-mail, and attaches the image file to the e-mail. After dialing the IPS 41 in S720, the CPU 11 determines in S722 whether connection to the ISP 41 has been established. If the determination in S722 is YES, the CPU 11 transmits the e-mail to the ISP 41 in S724. After detecting completion of the transmission (YES in S726), the CPU 11 disconnects from the internet 31 communication line in S728.

Thus, if a user performs a one-touch operation, that is, presses the urgent mode button 3F, the facsimile apparatus 1 can automatically transmit the image data read from a document by the image scanner 19, to the PC 45 at the addressee through the communication route via the internet 31, and to the facsimile apparatus 44 at the addressee side through the public communication switched network 32.

Therefore, it becomes unnecessary for a user to perform an operation of switching from one communication route to another or to cause the document to be read twice.

As long as the addressee is near at least one of the facsimile apparatus 44 and the PC 45, the addressee will immediately be aware of the reception of image data and can view the content of the received image data. Thus, the embodiment increases the likelihood that an addressee will be aware of reception of image data as soon as possible, providing an advantage in transmission of an urgent matter.

The operations executed in S630 and S640 by the CPU 11 serve as an instruction device. The operation in S642 serves as a determination device. The operations executed in S668, S670 by the CPU 11 serve as a notification device. The operations executed in S654, S662, S710, S724 by the CPU 11 serve as a transmission device.

As is apparent from the foregoing description of the mode, the transmission device of the facsimile apparatus according to the invention can automatically transmit image information through the two different communication routes, if the instruction device provides an instruction to transmit the image information through the two communication routes. Therefore, the facsimile apparatus eliminates the need for a user to perform an operation of confirming completion of the transmission through one of the two communication routes and then switching to the other communication route, which is required according to the conventional art. The invention thus simplifies the operations that an operator needs to perform. Furthermore, the invention increases the likelihood that the receiver will immediately obtain the transmitted information.

If the two different communication routes are a communication route via an internet and a public communication switched network, it becomes possible to determine whether transmission of image information through the two different communication routes is possible on the basis of whether both the mail address and the facsimile number of the receiver are stored in the storage device.

If only one of the mail address and the facsimile number is stored in correspondence with the receiver, the notification device notifies the transmitting operator that it is impossible to transmit the image information through the two communication routes. Therefore, in such a case, the transmitting operator of the facsimile apparatus can immediately take other measures.

Although in the foregoing description, each of the operations, i.e., sender and the addressee is connected to a single communication line, the two sides may also be connected to two lines. In such a case, image data can be transmitted from the facsimile apparatus 1 to the facsimile apparatus 44 and the PC 45 at the addressee through a parallel operation.

The above urgent transmission mode can also be employed without using a speed call identified addressee. By inputting the e-mail address and a telephone number so that they are stored in the temporary address information memory 13c the remaining processing for urgent mode transmission can be executed to send an important message to an addressee with whom the operator does not normally communicate.

Although in the foregoing description, the communication control operations illustrated in FIGS. 8, 9 and 11–16 are executed by the CPU 11 provided in the facsimile apparatus 1, the communication control operations may also be executed by the PC 53 connected to the facsimile apparatus 1. In such a case, the programs for executing the communication control operation illustrated in FIGS. 8, 9 and 11–16 are installed as application software into the PC 53, from a storage medium according to the invention, such as a DVD, CD-ROM or a floppy disk, which stores the programs.

Although in the foregoing description, the read image data in the form of an image file is attached to an e-mail for transmission, it is also possible to transmit image data by using the Hyper Text Transfer Protocol (HTTP) based on the World Wide Web (WWW) technique, or by superimposing image data on an IP packet by a product-dedicated method.

By using an e-mail transmission method, image information read by the image reading device can easily be transmitted.

The storage medium according to the invention stores computer programs including a program for controlling a facsimile apparatus including an image reading device that reads image information from a document, a storage device that stores receiver specifying information that specifies a receiver of the image information read by the image reading device, corresponding to the receiver, a selection device that enables selection of the receiver from information stored in the storage device, and a transmission device that transmits the image information read by the image reading device, to the addressee selected by the selection device, through a communication route, on the basis of registered or temporary addressee specifying information. The computer programs stored in the storage medium further include an instruction programs to provide for addressee specifying information registration and for providing an instruction to transmit the image information read by the image reading device to the addressee selected by the selection device using a priority mode or if in an urgent transmission mode through at least two different communication routes, and also include a transmission control program for, if the urgent transmission mode is instructed, i.e., transmitting the image information through the at least two different communication routes with or without use of the priority mode, on the basis of the addressee specifying information stored in correspondence with the receiver selected by the selection device. By using the storage medium, it becomes possible to realize a facsimile apparatus that facilitates the operations necessary for a user to perform in order to transmit image information read from a document by the image reading device through two different communication routes.

It is to be understood that the invention is not restricted to the particular forms shown in the foregoing description. Various modifications and alterations can be made thereto without departing from the scope of the invention.

What is claimed is:

1. A facsimile apparatus, comprising:
    a public line transmission means that executes a facsimile transmission of image data via a public switched communication network when a telephone number is designated as an address;
    an internet transmission means that executes a transmission of the image data via the internet when an e-mail address is designated as an address;
    a non-volatile address information registration memory storing the telephone number and the e-mail address for each addressee of a plurality of addressees in a priority order unique to each addressee that determines which of the public switched communication network and the internet will be used for transmission of the image data when an addressee is selected as the image data receiving party;
    an addressee selecting means that, when pressed, selects a desired addressee from among the plurality of addressees that are registered in the address information registration memory; and
    a transmission route determining means that determines whether to perform a transmission by using the public line transmission means or by using the internet transmission means in accordance with the priority order of the e-mail address and the telephone number of the addressee selected by the addressee selecting means, wherein the unique priority order is temporarily changed when the addressee selecting means is repressed after an addressee being selected by the addressee selecting means and before the image data transmission.

2. The facsimile apparatus according to claim 1, further comprising a priority order changing means for changing the unique priority order that is registered for the addressee selected by the addressee selecting means prior to the image data transmission, wherein the transmission route determining means then determines whether to perform the image data transmission by the public line transmission means or by the internet transmission means in accordance with the priority order as changed by the priority order changing means.

3. The facsimile apparatus according to claim 2, further comprising a display that displays the unique priority order for the addressee selected using the addressee selecting means.

4. The facsimile apparatus according to claim 2, wherein the addressee selecting means includes a one-touch button.

5. The facsimile apparatus according to claim 2, wherein the priority order changing means changes the unique priority order concerning the transmission route after the addressee being selected.

6. The facsimile apparatus according to claim 1, wherein the unique priority order is determined in accordance with the order that a user inputs the telephone number and the e-mail address for each addressee in the non-volatile address information registration memory.

7. The facsimile apparatus according to claim 1, further comprising a temporary memory for storing the telephone number and the e-mal address of an addressee for a one-time transmission.

8. The facsimile apparatus according to claim 1, wherein the transmission route determining means automatically switches transmission from the one of the public line transmission means and the internet transmission means determined by the priority order to the other of the public line transmission means and the internet transmission means when an attempted transmission on the priority transmission means fails.

9. The facsimile apparatus according to claim 1, further comprising an urgent transmission input device for instructing the transmission route determining means to determine performance of the image data transmission over both the public line transmission means and the internet transmission means in the priority order for the addressee.

10. The facsimile apparatus according to claim 1, further comprising a transmission connection detector that detects connection with the addressee; and
- retransmission means for controlling reperformance of the image data transmission for a predetermined number of times using the transmission means determined by the transmission route determining mans when the detector determines no connection is made with the addressee.

11. A facsimile device, comprising:
- first transmission means for transmitting image information via an internet;
- second transmission means for transmitting image information via a normal public communication switched network;
- switching/re-transmitting means for, when the facsimile device transmits the image information by the second transmission means to an addressee that can receive through both the public communication switched network and the internet and the image information cannot correctly reach the addressee when transmitted by the second transmission means, automatically switching to the other of the first transmission means and re-transmitting the image information; and
- a non-volatile address information registration memory storing the telephone number and the e-mail address for each addressee of a plurality of addressees in a priority order unique to each addressee that determines which of the public switched communication network and the internet will be used for transmission when an addressee is selected as the facsimile receiving party;
- an addressee selecting means that, when pressed, selects a desired addressee from among the plurality of addressees that are registered in the address information registration memory; and
- a transmission route determining means that determines whether to perform a facsimile transmission by using the second transmission means or by using the first transmission means in accordance with the priority order of the e-mail address and the telephone number of the addressee selected by the addressee selecting means, wherein the unique priority order is temporarily changed when the addressee selecting means is repressed after an addressee is selected by the addressee selecting means and before the image data transmission.

12. The facsimile device according to claim 11, wherein the first transmission means transmits image information through the internet via a specified server, and the facsimile device further comprises:
- automatic confirming means, which after transmission has been performed by the first transmission means to an addressee that can receive through both the public communication switched network and the internet, automatically proceeds to confirm whether a non-delivery automatically proceeds to confirm whether a non-delivery notice or a delivery notice has arrived at the server; and
- switching/re-transmitting means which, when it is confirmed by the automatic confirming means that a non-delivery notice has arrived at the server, or that, even though a specified time has elapsed, a delivery notice has not arrived, switches to the second transmission means and re-transmits the image information.

13. The facsimile device according to claim 11, further comprises:
- individual number-of-retransmission setting means that individually sets a number of re-transmissions for each of the first transmission means and the second transmission means; and
- switching/re-transmitting means which, when image formation cannot be made to reach an addressee that can receive through both the public communication switched network and the internet even though transmission has been repeated by one of the first transmission means and the second transmission means according to the setting of the individual number-of-retransmission setting means, automatically switches to the other transmitting means and re-transmits the image information.

14. The facsimile device according to claim 11, further comprising a priority order changing means that changes the unique priority order that is registered for the addressee selected by the addressee selecting means prior to the facsimile transmission, wherein the transmission route determining means then determines whether to perform the facsimile transmission by the public line facsimile transmission means or by the internet facsimile transmission means in accordance with the priority order as changed by the priority order changing means.

15. The facsimile device according to claim 14, further comprising a display that displays the unique priority order for the addressee selected using the addressee selecting means.

16. The facsimile device according to claim 11, further comprising an urgent transmission input device for instructing the transmission route determining means to determine performance of the facsimile transmission over both the public line transmission means and the internet facsimile transmission means in a priority order for the addressee.

17. The facsimile device according to claim 11, wherein the first transmission means transmits image information through the internet via a specified server, further comprising:

automatic confirming means for, after transmission has been performed by the first transmission means, automatically proceeding to confirm whether a non-delivery notice or a delivery notice has arrived at the server; and automatic re-transmitting means for, when it is determined by the automatic confirming means that a non-delivery notice has arrived at the server, or that, even though a specified time has elapsed, a delivery notice has not arrived at the server, performing re-transmission of the image information by the transmitting means.

18. The facsimile device according to claim 11, further comprising individual number-of-retransmission setting means for individually setting a number of re-transmissions for each of the first transmission means and the second transmission means.

19. The facsimile device according to claim 11, further comprising a temporary memory for storing the telephone number and the e-mail address of an addressee for a one-transmission.

20. A facsimile apparatus, comprising:

a storage device that stores addressee specifying information that specifies at least one of a mail address for transmission of image information through an internet and a facsimile number for transmission of the image information through a public switched communication network of an addressee to receive image information from the facsimile apparatus;

a selection device that enables user selection of the addressee from information stored in the storage device;

a transmission device that transmits the image information to the addressee selected by the selection device through a communication route, on the basis of the addressee specifying information;

a display that displays in a unique priority order the mail address for transmission of the image information through the internet and the facsimile number for transmission of the image information through the public switched communication network of the addressee to receive the image information; and an instruction device that provides an instruction to successfully transmit the image information the addressee selected by the selection device through both the public switched communication network and the internet, the transmission device, upon the instruction from the instruction device, sequentially transmitting the image information to the addressee through the public switched communication network and the internet, on the basis of the addressee specifying information stored in the storage device in correspondence to the addressee selected by the selection device, wherein the unique priority order of the displayed mail address and the facsimile number may be switched by the user for transmission of the image information.

21. The facsimile apparatus according to claim 20, wherein the facsimile apparatus further comprises a determination device that, upon the instruction from the instruction device, determines whether both the mail address and the facsimile number are stored in the storage device in correspondence with the address selected by the selection device, and when the determination device determines that both the mail address and the facsimile number are stored in correspondence with the selected receiver, the transmission device transmits the image information through both the internet and the public switched communication network.

22. The facsimile apparatus according to claim 21, further comprising a notification device that, if the determination device determines that only one of the mail address and the facsimile number is stored in correspondence with the addressee selected, notifies an operator that it is impossible to transmit the image information through the internet and the public switched communication network.

23. The facsimile apparatus according to claim 21, wherein the transmission device includes an e-mail transmission module that transmits an e-mail via the internet, and, if the image information is to be transmitted through the communication route via the internet, the image information is attached to an e-mail and then transmitted together with the e-mail to the addressee selected.

24. The facsimile apparatus according to claim 20, further comprising:

a non-volatile address information registration memory storing the facsimile number and the e-mail address for each addressee of a plurality of addressees in a priority order unique to each addressee that determines which of the at least two communication routes, the different communication routes being via a public switched communication network and via the internet, will be used for transmission when an addressee is selected as the facsimile receiving party;

an addressee selecting means that selects a desired addressee from among the plurality of addressees that are registered in the address information registration memory; and a transmission route determining means that determines whether to perform a facsimile transmission via the public switched communication network or via the internet in accordance with the priority order of the e-mail address and the telephone number of the addressee selected by the addressee selecting means.

25. The facsimile apparatus according to claim 24, further comprising a priority order changing means that changes the unique priority order that is registered for the addressee selected by the addressee selecting means prior to the facsimile transmission, wherein the transmission route determining means then determines whether to perform the facsimile transmission via the public switched communication network or via the internet in accordance with the priority order as changed by the priority order changing means.

26. The facsimile apparatus according to claim 25, further comprising a display that displays the unique priority order for the addressee selected using the addressee selecting means.

27. The facsimile apparatus according to claim 20, further comprising individual number-of re-transmission setting means that individually sets a number of re-transmissions for each of the at least two different communication routes.

28. The facsimile apparatus according to claim 20, further comprising individual number-of-retransmission setting means for individually setting a number of re-transmissions for each of the first transmission means and the second transmission means.

29. The facsimile apparatus according to claim 20, further comprising a temporary memory for storing a telephone number and an e-mail address of an addressee for a one-time transmission.

30. A facsimile apparatus, comprising:
   a public line facsimile transmission means that executes a facsimile transmission via a public switched communication network when a telephone number is designated as an address;
   an internet facsimile transmission means that executes a facsimile transmission via the internet when an e-mail address is designated as an address; a non-volatile address information registration memory storing the telephone number and the e-mail address for each addressee of a plurality of addressees in a priority order unique to each addressee that determines which of the public switched communication network and the internet will be used for transmission when an addressee is selected as the facsimile receiving party;
   an addressee selecting means that selects a desired addressee from among the plurality of addressees that are registered in the address information registration memory;
   a transmission route determining means that determines whether to perform a facsimile transmission by using the public line facsimile transmission means or by using the internet facsimile transmission means in accordance with the priority order of the e-mail address and the telephone number of the addressee selected by the addressee selecting means;
   a priority order changing means that changes the unique priority order that is registered for the addressee selected by the addressee selecting means prior to the facsimile transmission, wherein the transmission route determining means then determines whether to perform the facsimile transmission by the public line facsimile transmission means or by the internet facsimile transmission means in accordance with the priority order as changed by the priority order changing means;
   switching/re-transmitting means which, when the facsimile device transmits the image information by one of the public line facsimile transmission means and the internet facsimile transmission means to an addressee that can receive through both the public communication switched network and the internet and the image information cannot correctly reach the receiver when transmitted by the one of the public line facsimile transmission means and the internet facsimile transmission means, automatically switches to the other of the public line facsimile transmission means and the internet facsimile transmission means and re-transmits the image information; and
   an instruction device that provides an instruction to successfully transmit the image information to the addressee selected by the addressee selecting means through both the public switched communication network and the internet to the public line facsimile transmission means and the internet facsimile transmission means and, upon the instruction from the instruction device, the image information is transmitted sequentially to the addressee through the public switched communication network and the internet, on the basis of the addressee information stored in the non-volatile address information registration memory in correspondence to the addressee selected by the addressee selecting means.

31. The facsimile apparatus according to claim 30, further comprising an image data input device for one of reading a document and creating image information and directly inputting image data to create the image information.

32. The facsimile apparatus according to claim 30, further comprising individual number-of-retransmission setting means for individually setting a number of re-transmissions for each of the public line facsimile transmission means and the internet facsimile transmission means.

33. The facsimile apparatus according to claim 30, further comprising a temporary memory for storing the telephone number and the e-mail address of an addressee for a one-time transmission.

34. The facsimile apparatus according to claim 30, wherein the priority order changing means temporarily changes the unique priority order concerning the transmission route.

35. The facsimile apparatus according to claim 30, wherein the priority order changing means changes the unique priority order concerning the transmission route after the addressee being selected.

36. A facsimile apparatus, comprising:
   transmission means for transmitting an image data message over two different communication routes via an internet using electronic mail and via a public switched communication network using facsimile;
   a non-volatile memory storing identifying data for a plurality of addressees and address data via at least one of the communication routes for each addressee;
   an input device enabling selection of an addressee for receipt of the image data message;
   priority setting means for setting a priority communication route for transmission of the image data message;
   a priority changing means that changes the priority communication route set for transmission of the image data message; and
   a controller that directs transmission of the image data message over a specified route which is a one of the two different communication routes and both of the two different communication routes, wherein when the controller directs transmission of the image data message over both of the two different communication routes, the transmission means transmits the image data message over the two different communication routes sequentially, wherein the input device includes an urgent message designation device, the controller directing sequential transmission of the image data message to an addressee over both the public switched communication network and the internet for which an address to the addressee is available upon input from the urgent message designation device, and wherein when the controller directs transmission of the image data message over a specified route the transmission means transmits the image data message over one of the two different communication routes in accordance with the priority communication route as changed by the priority changing means.

37. The facsimile apparatus according to claim 36, wherein the controller will direct transmission over the specified route a predetermined number of times if each preceding attempted transmission fails.

38. The facsimile apparatus according to claim 36, further comprising at least one of an audio and a visual alarm to notify an operator that an address for the addressee is not available for each communication route.

* * * * *